(12) United States Patent
Yoshimura et al.

(10) Patent No.: US 12,511,778 B2
(45) Date of Patent: Dec. 30, 2025

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Shozo Yoshimura, Kanagawa (JP); Masakazu Fujiki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 681 days.

(21) Appl. No.: 17/874,642

(22) Filed: Jul. 27, 2022

(65) Prior Publication Data
US 2023/0034076 A1 Feb. 2, 2023

(30) Foreign Application Priority Data

Jul. 30, 2021 (JP) .................................. 2021-125231
Jul. 30, 2021 (JP) .................................. 2021-125243

(51) Int. Cl.
*G06T 7/73* (2017.01)
*G06T 7/20* (2017.01)
(Continued)

(52) U.S. Cl.
CPC ................. *G06T 7/73* (2017.01); *G06T 7/20* (2013.01); *G06V 10/443* (2022.01); *G06V 10/76* (2022.01)

(58) Field of Classification Search
CPC . G06T 2207/30232; G06T 2207/30241; G06T 2207/30252; G06T 7/20;
(Continued)

(56) References Cited

U.S. PATENT DOCUMENTS

2006/0018539 A1* 1/2006 Sato ....................... G06V 10/20
382/173
2006/0118539 A1* 6/2006 Leizerovich ........... H04B 1/036
219/209
(Continued)

FOREIGN PATENT DOCUMENTS

JP 3570198 B2 * 9/2004 ............. G01B 11/24
JP 2017167601 A 9/2017
(Continued)

OTHER PUBLICATIONS

Engel, J., et al. "LSN-SLAM: Large-Scale Direct Monocular SLAM".

*Primary Examiner* — Zhiyu Lu
(74) *Attorney, Agent, or Firm* — Canon U.S.A., Inc., IP Division

(57) ABSTRACT

An information processing apparatus that performs control related to movement of a moving object configured to measure its own position includes a memory storing instructions, and at least one processor that, upon execution of the instructions, is configured to operate as a first acquisition unit configured to acquire environmental information about an environment where the moving object moves, an estimation unit configured to estimate first positional information indicating that a region subjected to measurement accuracy degradation is below a threshold value based on the environmental information, and a determination unit configured to determine content of control information based on the first positional information.

8 Claims, 15 Drawing Sheets

(51) Int. Cl.
*G06V 10/44* (2022.01)
*G06V 10/75* (2022.01)

(58) Field of Classification Search
CPC ........... G06T 7/246; G06T 7/292; G06T 7/73; G06V 10/443; G06V 10/76; G06V 20/52
See application file for complete search history.

(56) References Cited

U.S. PATENT DOCUMENTS

| | | | |
|---|---|---|---|
| 2007/0124024 A1* | 5/2007 | Okamoto | B25J 9/0003 |
| | | | 700/245 |
| 2020/0193633 A1* | 6/2020 | Sugiyama | H04N 17/002 |
| 2021/0063578 A1* | 3/2021 | Wekel | G01S 17/894 |
| 2022/0026920 A1* | 1/2022 | Ebrahimi Afrouzi | G06N 7/01 |
| 2023/0009212 A1* | 1/2023 | Wang | G01S 5/0027 |
| 2023/0099779 A1* | 3/2023 | Redgewell | G01S 17/89 |
| | | | 356/614 |

FOREIGN PATENT DOCUMENTS

| | | | | |
|---|---|---|---|---|
| JP | 2019087073 A | | 6/2019 | |
| JP | 2020161141 A | | 10/2020 | |
| JP | 2021086212 A | | 6/2021 | |
| JP | 2021105831 A | | 7/2021 | |
| WO | WO-2020205682 A1 | * | 10/2020 | ............... G01C 3/08 |

\* cited by examiner

INFORMATION PROCESSING APPARATUS, INFORMATION PROCESSING METHOD, AND STORAGE MEDIUM

BACKGROUND

Field

The present disclosure relates to an information processing apparatus, an information processing method, and a storage medium.

Description of the Related Art

There has been proposed a technique for automatically moving a moving object such as a conveyance vehicle (e.g., an automated guided vehicle (AGV)) in an environment such as a factory or shipping storage. In automatically moving the moving object, real space mapping and self position and orientation measurement in the real space may be performed. An example of known methods for accomplishing this is the simultaneous localization and mapping (SLAM) method. Jakob Engel, et al. LSD-SLAM: Large-Scale Direct Monocular SLAM, Technical University Munich discusses a technique for comparing moving image frames captured by a camera with feature points on map information to estimate self position and orientation (imaging position and orientation of the camera).

SUMMARY

According to an aspect of the present disclosure, an information processing apparatus that performs control related to movement of a moving object configured to measure its own position includes a memory storing instructions, and at least one processor that, upon execution of the instructions, is configured to operate as a first acquisition unit configured to acquire environmental information about an environment where the moving object moves, an estimation unit configured to estimate first positional information indicating that a region subjected to measurement accuracy degradation is below a threshold value based on the environmental information, and a determination unit configured to determine content of control information based on the first positional information.

Further features of the present disclosure will become apparent from the following description of exemplary embodiments with reference to the attached drawings.

DESCRIPTION OF THE EMBODIMENTS

Exemplary embodiments of the present disclosure will be described below with reference to the accompanying drawings.

A first exemplary embodiment will be described below centering on an example where the present disclosure is applied to control of a moving object that conveys goods in a shipping storage. In the present exemplary embodiment, the moving object, on which a camera is mounted, measures its own position (e.g. self position) and orientation based on feature points extracted from an image captured by the camera. In the present exemplary embodiment, it is assumed that a plurality of moving objects or persons is working in the shipping storage. Thus, when lighting is turned on or off or an arrangement of articles on a shelf is changed, brightness of passages and walls changes to change the number and distribution of feature points to be extracted.

Accordingly, an overhead camera is installed at a position and orientation where a change in brightness in an ambient surrounding of the moving object can be captured. An information processing apparatus according to the present exemplary embodiment detects a change in brightness in the ambient surrounding of the moving object moving while measuring the self-position and orientation, by using images captured by the overhead camera. The information processing apparatus calculates variation of the position and orientation measurement accuracy based on the change in brightness, and adjusts the speed of the moving object before the moving object reaches a point or region subjected to measurement accuracy degradation. Thus, it is possible to keep driving the moving object in a stable manner.

Figure 1:
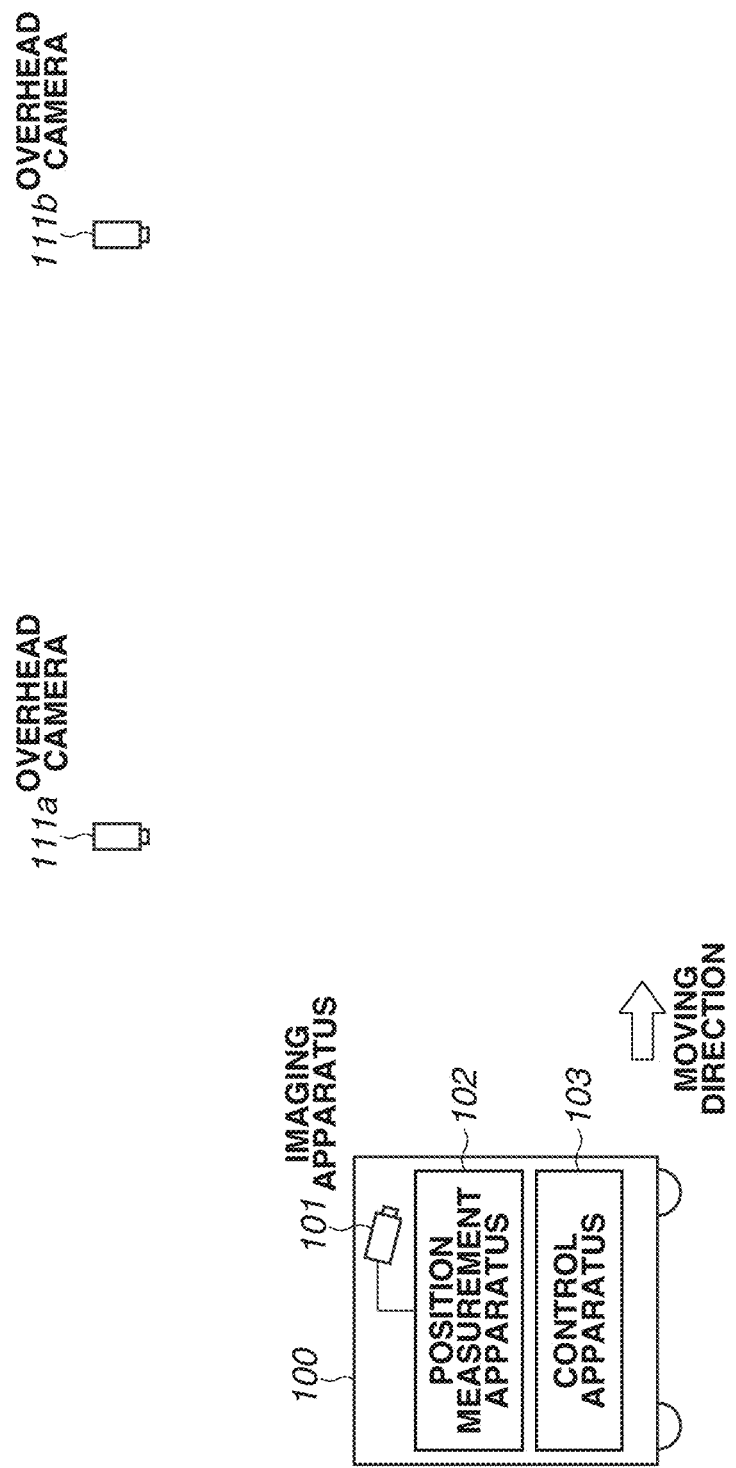
FIG. 1 illustrates an example of a configuration of a moving object system.

FIG. 1 illustrates an example of a moving object system according to the present exemplary embodiment. The moving object system illustrated in FIG. 1 is a system in which a moving object 100 automatically runs (moves) in a shipping storage. The moving object system includes the moving object 100, a plurality of overhead cameras 111a and 111b installed at suitable positions in the shipping storage, and an information processing apparatus 104 (FIG. 2) wirelessly connected with the overhead cameras 111a and 111b. The information processing apparatus 104 may be mounted on the moving object 100.

The overhead cameras 111a and 111b serves as sensors for detecting environmental information about the inside of the shipping storage. The overhead cameras 111a and 111b have an identical configuration and therefore are collectively described as an overhead camera 111. The environmental information relates to measurement accuracy of a position measurement apparatus 102 (described below). In the present exemplary embodiment, the information relates to a light source environment (brightness) on a path where the moving object 100 moves. The moving object 100 includes an imagine apparatus 101, the position measurement apparatus 102 that measures positional information of the moving object 100 based on captured images of the imaging apparatus 101, and a control apparatus 103 that controls a drive unit such as a motor of the moving object 100.

The imaging apparatus 101 captures images of the ambient surrounding of the moving object 100. In the present exemplary embodiment, the imaging apparatus 101 is mounted on the moving object 100 and moves with movement of the moving object 100. Alternatively, the imaging apparatus 101 may be configured to be fixed at a position and orientation where the position and orientation of the moving object 100 can be measured. The position measurement apparatus 102 measures the self-position and orientation based on captured images of the imaging apparatus 101. In the present exemplary embodiment, the position measurement apparatus 102 compares feature points on map information registered at the time of system configuration with feature points extracted from a captured image at the present time to measure the self-position and orientation. The control apparatus 103 controls the drive unit and various apparatuses included in the moving object 100 based on control information received from the information processing apparatus 104.

Figure 2:
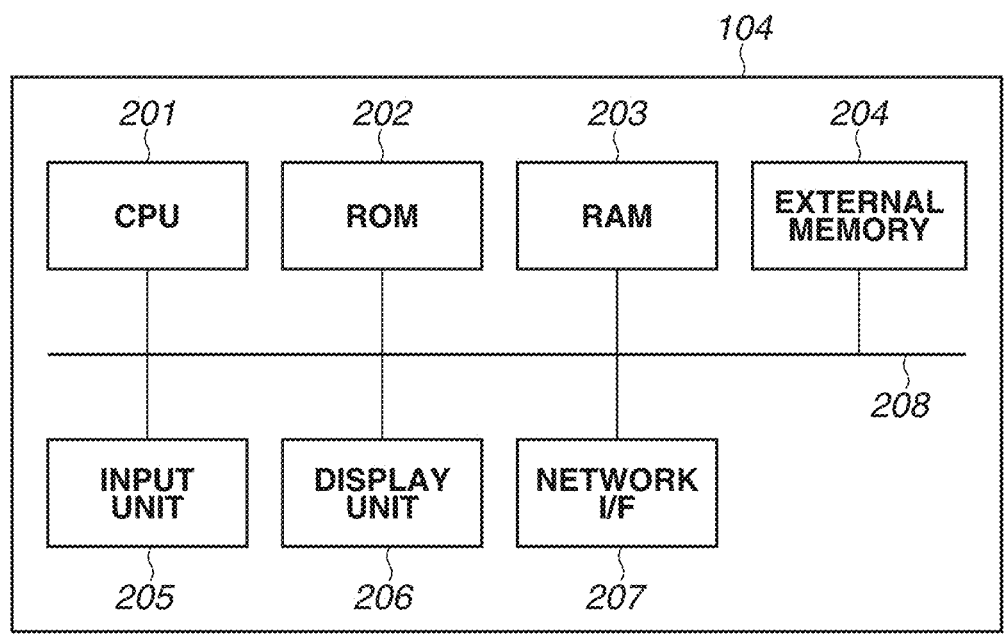
FIG. 2 illustrates an example of a hardware configuration of an information processing apparatus.

FIG. 2 illustrates an example of a hardware configuration of the information processing apparatus 104 according to the present exemplary embodiment. As illustrated in FIG. 2, the information processing apparatus 104 includes a central processing unit (CPU) 201, a read only memory (ROM) 202, a random access memory (RAM) 203, an external memory 204, an input unit 205, a display unit 206, and a network interface (I/F) 207. The units are connected with each other via a bus 208. The CPU 201 controls the entire information processing apparatus 104. Processing of the flowchart (described below) is implemented by the CPU 201 loading a program stored in the external memory 204 into the RAM 203 and executing the program. The ROM 202 stores data such as various setting values and parameters. The RAM 203 temporarily stores data and control information and serves as a work area used by the CPU 201 to execute various types of processing. The external memory 204 stores programs to be executed by the CPU 201 and a coordinate conversion data table (described below).

The input unit 205 including a keyboard, a mouse, and a robot controller receives information input operations. The display unit 206 outputs a processing result under control of the CPU 201. The display unit 206 may be a display of any type, such as a liquid crystal display (LCD) apparatus, a projector, and a light emitting diode (LED) indicator. The network I/F 207 implements network communication with an external apparatus. The information processing apparatus 104 transmits and receives various types of data to and from external apparatuses such as the moving object 100 and the overhead camera 111 via the network I/F 207. The CPU 201 receives a captured image from the overhead camera 111 via the network I/F 207. The CPU 201 also receives a measurement result by the position measurement apparatus 102 from the moving object 100 via the network I/F 207, and transmits control information of the control apparatus 103 to the moving object 100.

Figure 3:
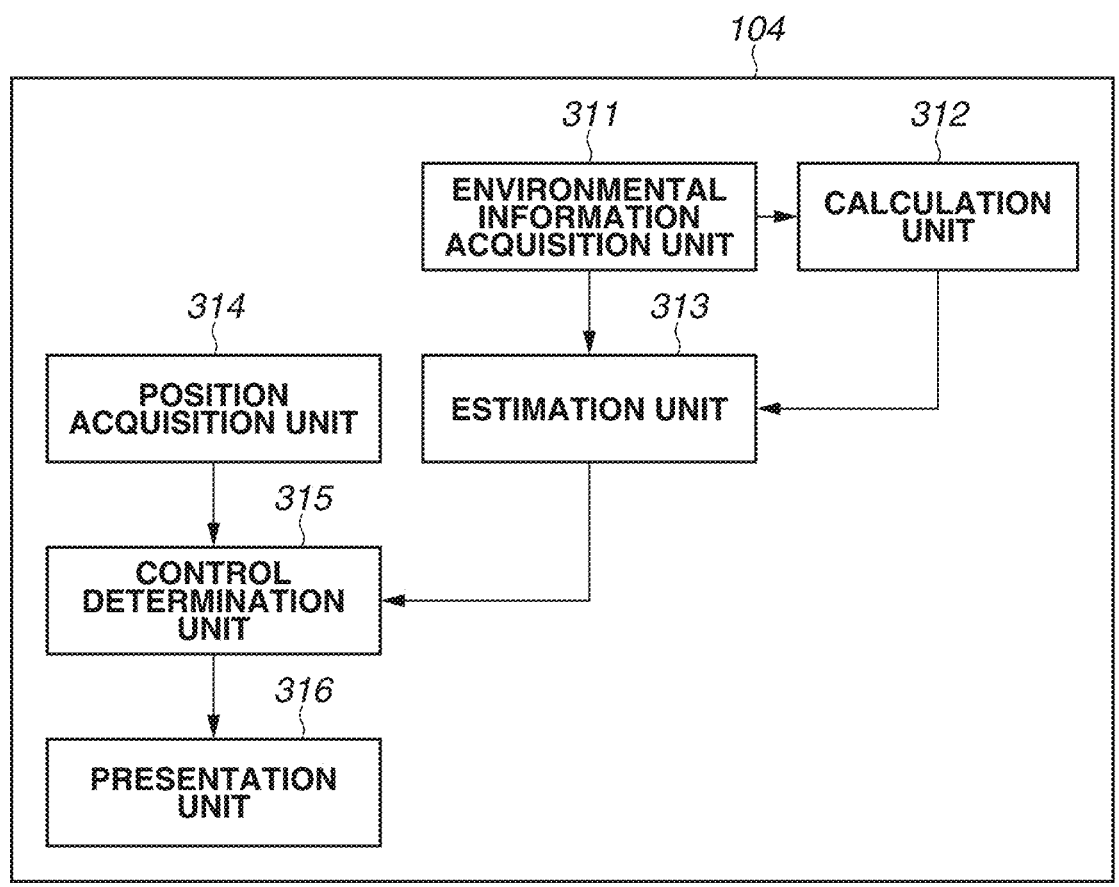
FIG. 3 illustrates an example of a functional configuration of the information processing apparatus.

FIG. 3 illustrates an example of a functional configuration of the information processing apparatus according to the present exemplary embodiment. By the CPU 201 executing programs stored in the external memory 204, the information processing apparatus 104 functions as an environmental information acquisition unit 311, a calculation unit 312, an estimation unit 313, a position acquisition unit 314, a control determination unit 315, and a presentation unit 316.

The environmental information acquisition unit 311 acquires environmental information in an environment where the moving object 100 moves.

In the present exemplary embodiment, the environmental information acquisition unit 311 receives a captured image from the overhead camera 111 and acquires luminance values of floor and wall surfaces from the captured image during movement of the moving object 100. The environmental information acquisition unit 311 reads the coordinate conversion data table from the external memory 204. The table is used to convert a pixel position in the captured image of the overhead camera 111 into three-dimensional coordinates representing three-dimensional positions in the shipping storage. The three-dimensional coordinates are represented by a coordinate system for representing a position in the shipping storage with the starting position of the moving object 100 set as the origin. By using the coordinate conversion data table, the environmental information acquisition unit 311 generates data indicating a relation between the position of each pixel in the captured image of the overhead camera 111 and the three-dimensional position in the shipping storage, and provides the estimation unit 313 with the data. The environmental information acquisition unit 311 also provides the calculation unit 312 with the captured image of the overhead camera 111.

The calculation unit 312 calculates variation of the measurement accuracy of the position measurement apparatus 102 based on a change of the environmental information. In the present exemplary embodiment, the calculation unit 312 compares an image captured during the map generation (step S401 in FIG. 4) with a captured image provided by the environmental information acquisition unit 311 and calculates a variation of the luminance value for each pixel (hereinafter the image captured during the map generation is referred to as a reference image). Then, the calculation unit 312 calculates a variation of the measurement accuracy of the position measurement apparatus 102 due to a change in brightness in the operating environment of the moving object 100 based on the variation of the calculated luminance value. The calculation result is provided to the estimation unit 313. The calculation unit 312 may divide the captured image of the overhead camera 111 into a plurality of regions, and calculate the variation of the measurement accuracy for each region based on a ratio of the number of pixels whose luminance value has changed to the total number of pixels in each region.

The estimation unit 313 estimates a point or region subjected to a change in the measurement accuracy of the position measurement apparatus 102.

In the present exemplary embodiment, the estimation unit 313 estimates a position subjected to a change in measurement accuracy on the three-dimensional coordinates (with the starting position of the moving object 100 set as the origin) based on the data provided from the environmental information acquisition unit 311 and a pixel position where a change in measurement accuracy was detected by the calculation unit 312. The estimation unit 313 provides the control determination unit 315 with estimated positional information. Based on points where the measurement accuracy of the position measurement apparatus 102 changes, the estimation unit 313 may obtain a circumscribed polygon of the points, and estimate an internal region of the polygon as a region subjected to a change in measurement accuracy of the position measurement apparatus 102. The estimation unit 313 may identify a point or region subjected to a change in measurement accuracy of the position measurement apparatus 102 in a two- or three-dimensional space.

The position acquisition unit 314 acquires the positional information of the moving object 100 measured by the position measurement apparatus 102 from the moving object 100. The position acquisition unit 314 provides the control determination unit 315 with the acquired positional information.

The control determination unit 315 determines control information that provides a description of the movement of the moving object 100 and peripheral apparatuses of the moving object 100 based on a positional relation between the positional information provided by the estimation unit 313 and the positional information provided by the position acquisition unit 314. The control determination unit 315 determines the control information for stably moving (running) the moving object 100 even if the measurement accuracy of the position measurement apparatus 102 changes. The control determination unit 315 transmits the determined control information to the moving object 100 and the peripheral apparatuses of the moving object 100.

In the present exemplary embodiment, if the point or region estimated by the estimation unit 313 lies in part of the path where the moving object 100 moves, the control determination unit 315 determines to perform a deceleration control on the moving object 100 with a predetermined deceleration. More specifically, the control determination unit 315 transmits the determined control information to the moving object 100 immediately before the moving object 100 enters the region estimated by the estimation unit 313.

When the moving object 100 receives the control information, the control apparatus 103 reduces a rotational speed of the motor to enable the moving object 100 to stably move (run) in a region subjected to the degradation of the measurement accuracy of the position measurement apparatus 102. When the moving object 100 is positioned in the region estimated by the estimation unit 313, the information processing apparatus 104 may immediately transmit the determined control information to the moving object 100.

The presentation unit 316 displays the control information determined by the control determination unit 315 to the display unit 206.

Figure 4:
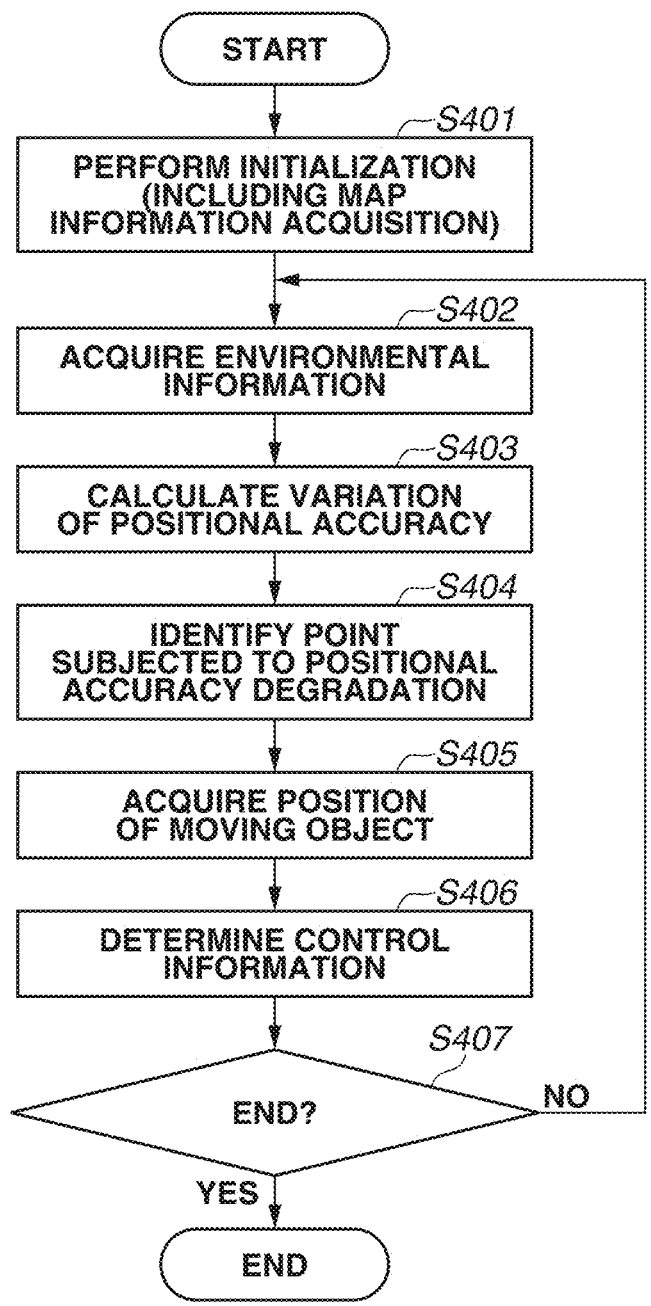
FIG. 4 is a flowchart illustrating processing performed by the information processing apparatus.

Processing performed by the information processing apparatus 104 according to the present exemplary embodiment will be described below. FIG. 4 is a flowchart illustrating the processing performed by the information processing apparatus 104. The flowchart in FIG. 4 is implemented by the CPU 201 loading a program stored in the external memory 204 into the RAM 203 and then executing the program. The flowchart in FIG. 4 is performed when a map indicating the path where the moving object 100 moves is generated. The reference numeral of each step of the flowchart is supplied with a prefix S, which stands for step.

In step S401 as an initialization step, the CPU 201 stores, in the ROM 202, map-related information with regard to the operating environment of the moving object 100 (environmental information representing brightness in map generation, and the starting position of the moving object 100) and various setting values including an operation speed of the moving object 100. The CPU 201 reads the above-described coordinate conversion data table, the operation speed when the moving object 100 is decelerated, and predetermined parameters used to convert the variation of the luminance value into a variation of the position measurement accuracy in step S403, from the external memory 204. The position measurement apparatus 102 acquires camera parameters necessary for self-position measurement. In this case, the CPU 201 performs image capturing by the overhead camera 111 at least once, and sets a threshold value of the variation of the luminance value for detecting a change in the measurement accuracy of the position measurement apparatus 102 by using a captured image (the reference image).

When the moving object 100 starts moving, the CPU 201 starts receiving a captured image currently being captured by the overhead camera 111 and a position and orientation currently being measured by the position measurement apparatus 102. The CPU 201 repetitively performs the processing in steps S402 to S406 at predetermined intervals. An interval may be a predetermined time interval or a predetermined distance interval on the path where the moving object 100 moves. The processing may be constantly and repetitively performed.

In step S402, the CPU 201 acquires the environmental information in the operating environment of the moving object 100. More specifically, the CPU 201 acquires the luminance value from the captured image of the overhead camera 111 at the present time. When a plurality of overhead cameras 111 exists, the CPU 201 may generate the environmental information by integrating luminance value information of captured images of the plurality of overhead cameras 111.

In step S403, the CPU 201 compares the captured image at the present time with a captured image captured before the present time to detect a change in measurement accuracy of the position measurement apparatus 102 due to a change in brightness in the operating environment of the moving object 100 based on information about the luminance values of the floor and wall surfaces. More specifically, the CPU 201 compares the luminance value captured in step S402 with the luminance value of the reference image acquired in step S401 for each corresponding pixel to calculate an absolute value of a difference between the luminance values as a variation. When the variation is larger than or equal to the threshold value set in step S401, the CPU 201 sets a degree of accuracy degradation for the pixel to 1. On the other hand, when the variation is less than the threshold value, the CPU 201 sets the degree of accuracy degradation to 0. Thus, the CPU 201 identifies a pixel position subjected to the position measurement accuracy degradation.

In step S404, the CPU 201 estimates a point subjected to a change in position measurement accuracy in the space where the moving object 100 moves. More specifically, the CPU 201 identifies a point subjected to the position measurement accuracy degradation based on an image region including the pixel position where the degree of accuracy degradation is set to 1 in step S403, and the coordinate conversion data table read in step S401.

In step S405, the CPU 201 acquires position coordinates of the moving object 100 in a space coordinate system where the moving object 100 moves.

In step S406, the CPU 201 calculates distances between respective points estimated in step S404 and the position of the moving object 100. When any of the distances is less than a predetermined threshold value, the CPU 201 determines that the moving object 100 is approaching a point subjected to the position measurement accuracy degradation and determines to perform the deceleration control on the moving object 100.

On the other hand, when all of the distances are larger than or equal to the predetermined threshold value, the CPU 201 does not decelerate the moving object 100. The distance between each of the points estimated in step S404 and the position of the moving object 100 may be a distance on the path where the moving object 100 moves or a distance in the space coordinate system where the moving object 100 moves. The CPU 201 transmits the determined control information to the moving object 100 via the network I/F 207.

In step S407, the CPU 201 repeats the processing in steps S402 to S406 until the CPU 201 determines that an end instruction is input from the input unit 205. When the CPU 201 determines that the end instruction is input (YES in step S407), the processing exits the flowchart in FIG. 4.

Figure 5:
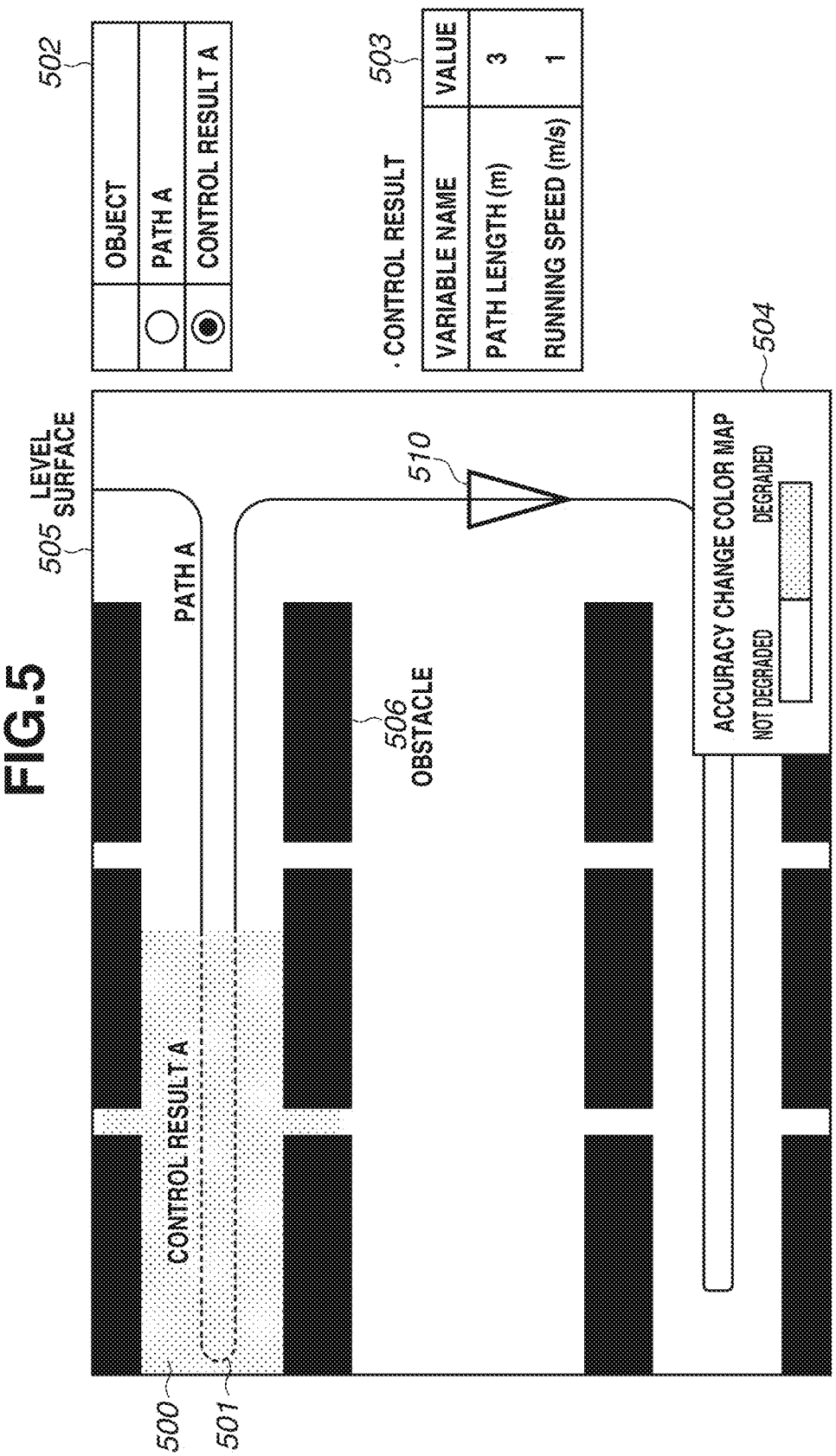
FIG. 5 illustrates an example of a graphical user interface (GUI) screen.

In the present exemplary embodiment, the CPU 201 displays a graphical user interface (GUI) screen that reflects the control information determined in step S406 on the display unit 206. FIG. 5 illustrates an example of the GUI screen. The user confirms and edits the control information of the moving object 100 by using the GUI screen. The GUI screen in FIG. 5 displays a level surface 505 when space coordinates where the moving object 100 moves is viewed from above. An icon 510 indicates the position and orientation of the moving object 100 on the level surface 505. On the level surface 505, there are illustrated the positions and sizes of obstacles 506 in the space where the moving object 100 moves, and a path A where the moving object 100 moves planned by the user.

The moving object 100 starts from the upper right end of the level surface 505, turns 90 degrees to the right, and then keeps moving.

A region 500 displays, in gray, the background of a region estimated to be subjected to the degradation of the measurement accuracy of the position measurement apparatus 102. A portion 501 drawn with a broken line in the region 500 indicates a path where the control of the moving object 100 is reflected in the region subjected to the measurement accuracy degradation. In the example illustrated in FIG. 5, the moving object 100 enters the region subjected to the measurement accuracy degradation from a region not subjected to a change in measurement accuracy. In the present exemplary embodiment, the CPU 201 performs the deceleration control on the moving object 100 in the region subjected to the degradation of the measurement accuracy of the position measurement apparatus 102. Thus, at the broken line portion 501, the moving object 100 moves (runs) at a speed lower than a normal moving speed in the path A.

As illustrated in FIG. 5, the GUI screen displays an object list 502 and a control result 503 on the right-hand side. The object list 502 displays a list of objects indicating the control information on the level surface 505 in a selectable way. The control result 503 displays a list of detailed control parameters of the object selected in the object list 502. The control parameters relate to the control information (the length of the path and the running speed of the moving object 100) determined in step S406. An accuracy change color map 504 represents the relation between a background color on the level surface 505 and whether the position measurement accuracy is degraded. In the present exemplary embodiment, the CPU 201 displays, in gray, the background color of the region subjected to the position measurement accuracy degradation to distinguish the region from the region not subjected to a change in position measurement accuracy.

The above-described first exemplary embodiment makes it possible to stably move (run) the moving object 100 having a self-position and orientation measurement function even in an environment subjected to the position measurement accuracy degradation. This enables preventing an occurrence of a collision of the moving object 100 which is likely to occur in a dark place in the shipping storage.

As a first modification of the present exemplary embodiment, the method for acquiring the environmental information in step S402 in FIG. 4 is not limited to the method for acquiring the information from a captured image of the overhead camera 111 as long as the method can acquire the brightness and the point in the operating environment of the moving object 100. For example, the CPU 201 may acquire information about a lighting state of a lighting fixture in the shipping storage and an irradiation range of the lighting fixture in the space coordinates where the moving object 100 moves. The CPU 201 may further acquire information about a frequency and a color tone of the lighting fixture. Alternatively, the CPU 201 may acquire output values of a plurality of illuminometers installed in the vicinity of the path of the moving object 100 and measurement ranges of the illuminometers. The CPU 201 may acquire the environmental information from a captured image of the imaging apparatus 101 mounted on the moving object 100, and information about the position, the imaging direction, and the angle of field of the moving object 100.

As a second modification of the present exemplary embodiment, the method for converting the coordinates of an image of the overhead camera 111 into the three-dimensional coordinates is not limited to the method for using the coordinate conversion data table as long as the method enables unique conversion. Examples of the method include a method for calculating three-dimensional coordinates in the space where the moving object 100 moves from the pixel position on the captured image by a known distance measurement technique by using the overhead camera 111 as a stereo camera. The examples of the method may also include a method for calculating three-dimensional coordinates by combining a camera capable of measuring luminance values with a known positional relation between pixels and a camera capable of capturing a range image.

As a third modification of the present exemplary embodiment, the method for measuring the self-position and orientation is not limited to the method for using a captured image of the imaging apparatus 101 as long as the method is capable of measuring the positional information of the moving object 100 in a world coordinate system in the operating environment of the moving object 100. Examples of the method include a method for measuring the positional information of the moving object 100 through image measurement or image recognition based on a captured image of a camera not mounted on the moving object 100. The method may be a method for measuring the positional information based on an output value of a position sensor such as a Global Positioning System (GPS) sensor attached to the moving object 100. The method may be a method for specifying the position of the moving object 100 on the map representing the operating environment of the moving object 100 by the user. Further, the method may be a method for using edge arrangements and distance information obtained from a depth image as indexes of position measurement.

As a fourth modification of the present exemplary embodiment, the control information determined by the CPU 201 in step S406 in FIG. 4 are not limited to the deceleration control on the moving object 100. For example, the CPU 201 may control a sound output apparatus (not illustrated) mounted on the moving object 100 to output a warning sound. Further, the CPU 201 may control the sound output apparatus to change the volume and range of the warning sound depending on the magnitude of the variation of the measurement accuracy. The CPU 201 may perform control to change image processing parameters used in extracting feature points from a captured image of the imaging apparatus 101. The CPU 201 may also perform control to change feature points on the map information and change the map information in performing position and orientation measurement. The CPU 201 may also perform control to change the path where the moving object 100 moves so that the moving object 100 detours the point or region estimated in step S404 in FIG. 4. If an obstacle sensor is mounted on the moving object 100, the CPU 201 may also perform control on the obstacle sensor to increase a threshold value of a distance for detecting whether an obstacle exists. The CPU 201 may also perform control to accelerate the moving object 100 when the distance between each point estimated in step S404 and the position of the moving object 100 becomes larger than or equal to the threshold value.

As a fifth modification of the present exemplary embodiment, a method for dynamically changing the control information based on the variation of the measurement accuracy in a point or region subjected a change in the measurement accuracy of the position measurement apparatus 102 will be described below. In step S403 in FIG. 4, the CPU 201 detects the measurement accuracy degradation by determining whether the variation of the luminance value is larger than or equal to the threshold value. In the present modification, the CPU 201 recognizes the variation of the luminance value as an amount of the measurement accuracy degradation. The CPU 201 may calculate the amount of the measurement accuracy degradation by using a stepwise threshold value. The CPU 201 may convert the variation of the luminance value into a variation in measurement accuracy by using a predetermined parameter. In the present modification, in step S406 in FIG. 4, the CPU 201 differentiates the control parameter depending on the amount of the degradation calculated in step S403. More specifically, the CPU 201 performs control to decelerate the moving object 100 in a stepwise manner. In a case where the moving object 100 moves in a region subjected to the measurement accuracy degradation, the CPU 201 also performs control to decelerate the moving object 100 in a stepwise manner depending on the amount of the measurement accuracy degradation.

Figure 6:
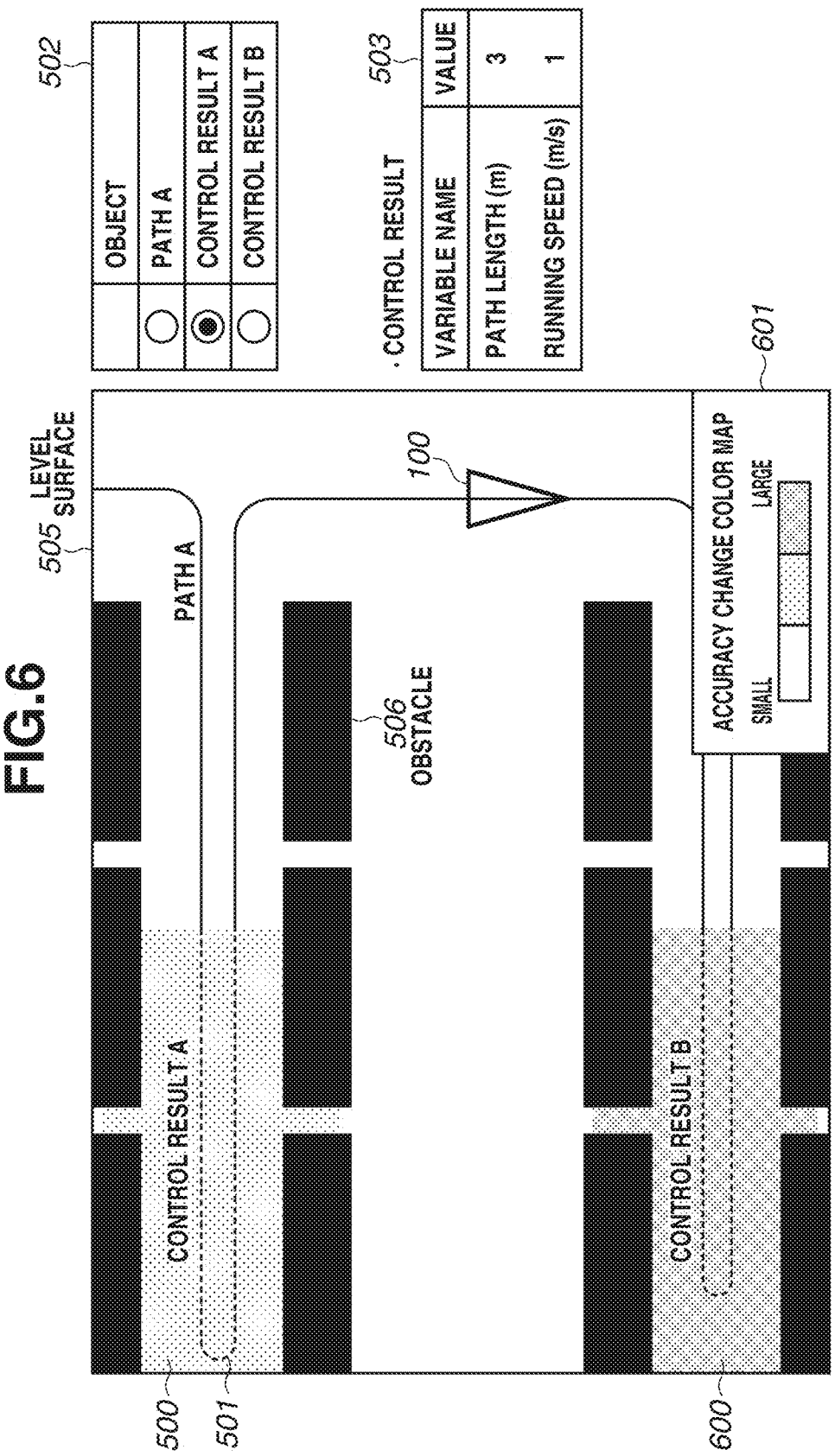
FIG. 6 illustrates an example of the GUI screen.

FIG. 6 illustrates an example of the GUI screen according to the present modification. Descriptions will be made centering on a difference from the GUI screen in FIG. 5. A region 600 displays, in gray, the background of a region estimated to be subjected to the degradation of the measurement accuracy of the position measurement apparatus 102. The region 600 is displayed in darker gray than the region 500 and represents different control information from the control information for the region 500. The region 600 is subjected to a larger amount of the measurement accuracy degradation than that of the region 500. The background color on the level surface 505 is colored based on a calculation result by the calculation unit 312. An accuracy change color map 601 represents the relation between a background color on the map and the amount of degradation of the measurement accuracy of the position measurement apparatus 102. In the present modification, the region 600 is subjected to the larger amount of the measurement accuracy degradation than that of the region 500. Therefore, in the region 600, the CPU 201 controls the moving object 100 to move at a lower speed than in the region 500.

The first exemplary embodiment has been described above centering on a method for detecting a change in measurement accuracy of the position measurement apparatus 102 based on the luminance values acquired from a captured image of the overhead camera 111. A second exemplary embodiment will be described below centering on a method for detecting a change in measurement accuracy of the position measurement apparatus 102 based on feature points extracted from a captured image of the overhead camera 111. The second exemplary embodiment will be described below centering on differences from the first exemplary embodiment. Descriptions of portions similar to those in the first exemplary embodiment will be omitted.

The second exemplary embodiment differs from the first exemplary embodiment in the processing in steps S402 to S404 in the flowchart in FIG. 4.

As a prerequisite, in step S401, the CPU 201 performs the processing for setting the threshold value of the variation of feature points to detect a change in measurement accuracy of the position measurement apparatus 102.

In the present exemplary embodiment, in step S402, the CPU 201 acquires positions of feature points (distribution of feature point) from the captured image of the overhead camera 111 at the present time.

In the present exemplary embodiment, in step S403, the CPU 201 detects a change in the measurement accuracy of the position measurement apparatus 102 based on the distribution of feature points in the captured image at the present time and a captured image captured before the present time. More specifically, the CPU 201 calculates, as a variation, an absolute value of a difference in the number of feature points between the captured image at the present time and the captured image at a preceding time. When the variation is larger than equal to a threshold value, the CPU 201 sets the degree of the accuracy degradation to 1. On the other hand, when the variation is less than the threshold value, the CPU 201 sets the degree of the accuracy degradation to 0.

In the present exemplary embodiment, in step S404, when the degree of the accuracy degradation is 1, the CPU 201 estimates a point or region subjected to the position measurement accuracy degradation in the space where the moving object 100 moves based on the distribution of feature points the number of which is changed. More specifically, the CPU 201 divides the captured image of the overhead camera 111 into a plurality of image regions and identifies an image region including changed feature points the number of which is larger than or equal to the threshold value set in step S401. Subsequently, the CPU 201 estimates the region subjected to the measurement accuracy degradation based on the identified image region and the coordinate conversion data table read in step S401.

The above-described second exemplary embodiment makes it possible to stably move (run) the moving object 100 having a self-position and orientation measurement function even in an environment subjected to the position measurement accuracy degradation. This enables preventing an occurrence of a collision of the moving object 100 which is likely to occur in a dark place in the shipping storage.

While, in the present exemplary embodiment, the CPU 201 detects the measurement accuracy degradation based on the change in the number of feature points extracted from a captured image of the overhead camera 111, the exemplary embodiment is not limited thereto as long as the method detects the measurement accuracy degradation based on a change of the feature points. For example, the CPU 201 may divide the captured image into a plurality of regions, and calculate the degree of the accuracy degradation through threshold value processing based on a change in the number of feature points included in each region. Alternatively, the CPU 201 may calculate a variance of the coordinates of the feature points and perform the threshold value processing based on the variance in each axis direction in the coordinates of the captured image to calculate the degree of the accuracy degradation. Alternatively, the CPU 201 may set the number of changed feature points included in the captured image as the degree of the accuracy degradation.

Further, the CPU 201 may calculate the degree of the accuracy degradation based on a combination of the number of feature points and the distribution of feature points.

While, in the present exemplary embodiment, the CPU 201 estimates a region subjected to the position measurement accuracy degradation based on the number of feature points extracted from the captured image of the overhead camera 111, the method for identifying the region subjected to the position measurement accuracy degradation is not limited thereto. For example, the CPU 201 may estimate the region subjected to the position measurement accuracy degradation through a comparison between the regions obtained by dividing the captured image of the overhead camera 111.

While, in the present exemplary embodiment, the CPU 201 controls the moving object 100 based on a two-dimensional arrangement of feature points, the CPU 201 may control the moving object 100 based on a three-dimensional arrangement of feature points. For example, the CPU 201 may calculate spatial positions of feature points in the captured image based on output information from a sensor of the imaging apparatus 101 mounted on the moving object 100. Then, the CPU 201 may identify the spatial positions (region) subjected to the position measurement accuracy degradation based on the number and distribution of three-dimensionally arranged feature points whose spatial positions have been calculated.

The first exemplary embodiment has been described above centering on a method for changing the speed of the moving object 100 if a point or region subjected to a change in measurement accuracy of the position measurement apparatus 102 lies in part of the path where the moving object 100 moves. A third exemplary embodiment will be described below centering on a method for changing an exposure parameter of the imaging apparatus 101 mounted on the moving object 100 instead of the method for changing the speed of the moving object 100. The third exemplary embodiment will be described below centering on a difference from the first exemplary embodiment. Descriptions of portions similar to those in the first exemplary embodiment will be omitted.

The present exemplary embodiment differs from the first exemplary embodiment in the processing in step S406 of the flowchart in FIG. 4.

As a prerequisite, in step S402, the CPU 201 calculates an amount of decrease of the luminance value by using the luminance value in the captured image of the overhead camera 111 acquired in step S402. When there is a pixel where the amount of decrease of the luminance value is larger than or equal to a predetermined threshold value, the amount of degradation of the position and orientation measurement accuracy is set to 1 for the pixel and set to 0 for other pixels.

In the present exemplary embodiment, in step S406, the CPU 201 performs processing for increasing the exposure parameter of the imaging apparatus 101 at the point corresponding to the pixel determined to be subjected to the degradation of the position and orientation measurement accuracy in step S402. This makes it easier to extract feature points from the captured image of the imaging apparatus 101 even in a dark place in the shipping storage, thus inhibiting the measurement accuracy degradation.

The above-described third exemplary embodiment makes it possible to stably move (run) the moving object 100 having a self-position and orientation measurement function even in an environment subjected to the position measurement accuracy degradation. This enables preventing an occurrence of a collision of the moving object 100 which is likely to occur in a dark place in the shipping storage.

When the luminance value of the captured image of the overhead camera 111 decreases, in the present exemplary embodiment, the exposure parameter of the imaging apparatus 101 in the moving object 100 is increased. On the other hand, when the luminance value of the captured image of the overhead camera 111 increases, the CPU 201 may decrease the exposure parameter of the imaging apparatus 101 in the moving object 100. Parameters to be controlled are not limited to the exposure parameter of the imaging apparatus 101 but include other camera parameters of the imaging apparatus 101 and parameters of various devices that affect the measurement accuracy of the position measurement apparatus 102. For example, parameters for the shutter speed, the diaphragm, and the frame rate of the imaging apparatus 101 may be controlled.

<First Modification>

Figure 7A:
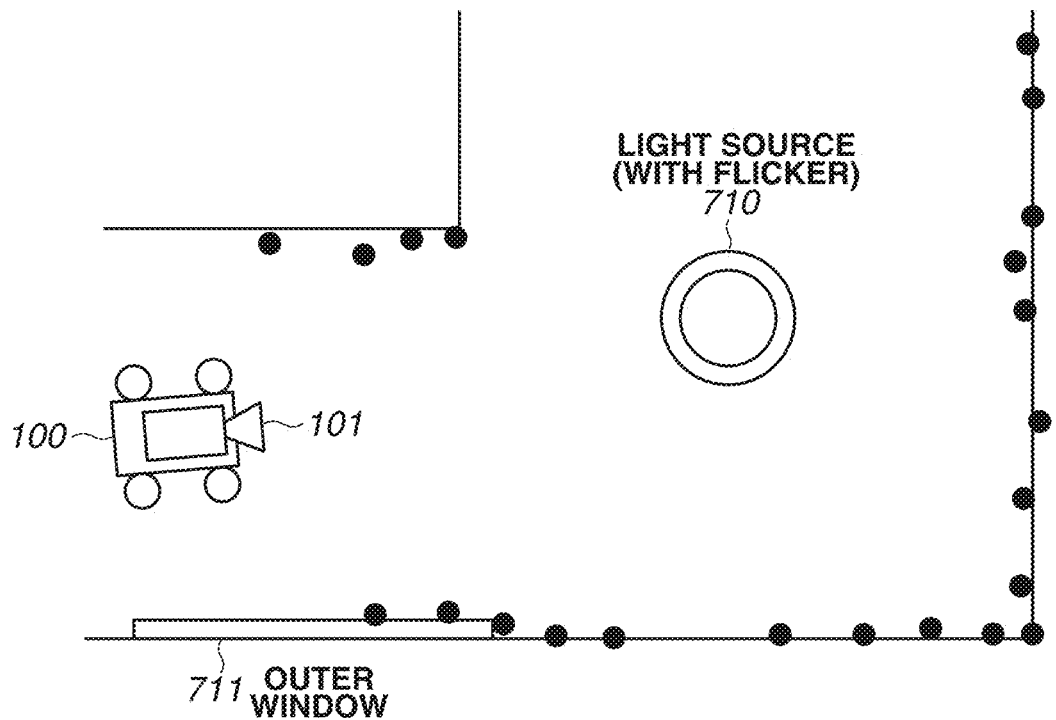
FIGS. 7A and 7B illustrate captured images of the inside of a shipping storage.
Figure 7B:
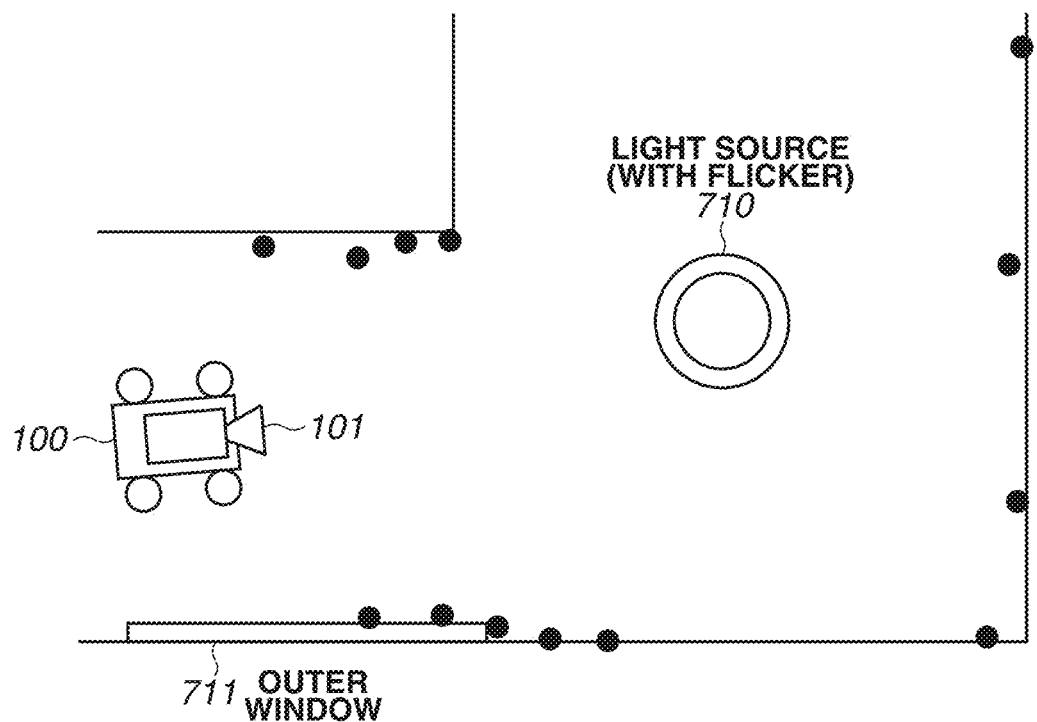

A first modification will be described below centering on an example where the present disclosure is applied to control of a moving object that conveys goods in a shipping storage. FIGS. 7A and 7B illustrate captured images of the inside of the shipping storage. A light source 710 and an outer window 711 are provided in the shipping storage as facilities for providing the lighting environment in the shipping storage. The light source 710 is an illumination apparatus, such as a fluorescent lamp, that produces a flicker phenomenon. The outer window 711 can take in external light. On the moving object 100 moving in the shipping storage, the imaging apparatus 101 is mounted. In the present modification, the moving object 100 measures the self-position and orientation based on feature points extracted from frame images of a moving image captured by the imaging apparatus 101. In FIGS. 7A and 7B, the positions of extracted feature points are indicated with black circles.

A luminance variation between the frame images due to a frequency (hereinafter referred to as a flicker frequency) at which a light amount changes by the flicker phenomenon of the light source 710 is referred to as a flicker origin luminance variation. A feature point extracted from one frame image but not extracted from another frame image is referred to as a flickering feature point. FIGS. 7A and 7B illustrate feature points extracted from images captured at different times. FIG. 7A illustrates feature points extracted around the light source 710, whereas FIG. 7B illustrates a smaller number of feature points around the light source 710. The number of extracted feature points depends on the time of capturing the frame images. The feature points extracted in FIG. 7A but not extracted in FIG. 7B are flickering feature points.

The information processing apparatus according to the present modification detects an occurrence of a flicker origin luminance variation based on a comparison result between a plurality of frame images in an environment where the moving object 100 moves while performing the self-position and orientation measurement. Then, the information processing apparatus estimates a region subjected to the position measurement accuracy degradation based on a detection result, and performs control to adjust the speed of the moving object 100 before the moving object 100 reaches a point or region subjected to the position measurement accuracy degradation. This enables the moving object 100 to keep stably operating.

The moving object system according to the present modification is a system in which the moving object 100 automatically runs (moves) in a shipping storage. The moving object system includes the moving object 100, and the information processing apparatus (FIG. 8B) wirelessly connected with the moving object 100. The information processing apparatus may be mounted on the moving object 100.

Figure 8A:
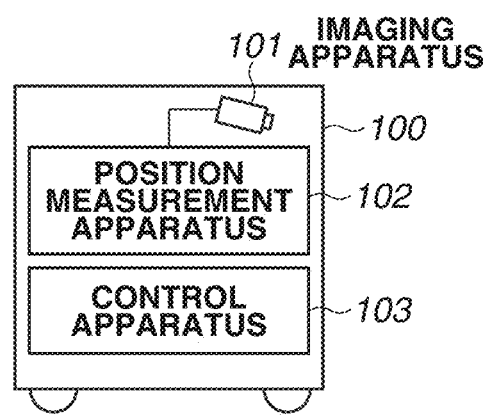
FIGS. 8A and 8B illustrate examples of configurations of a moving object and the information processing apparatus, respectively.
Figure 8B:
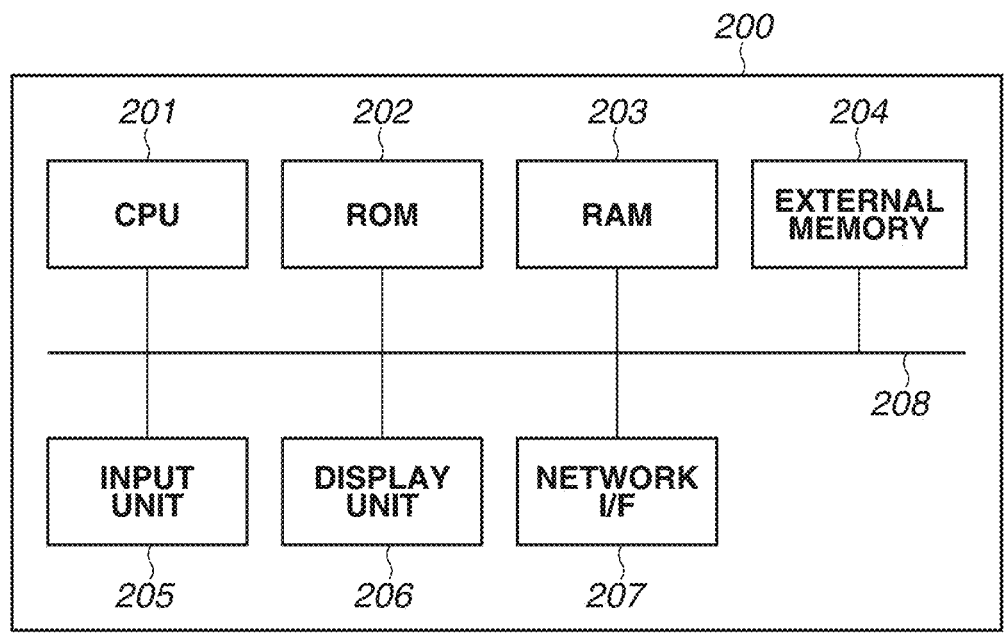

FIG. 8A illustrates an example of a configuration of the moving object 100. The moving object 100 is capable of performing data transmission and reception with the information processing apparatus. The moving object 100 includes the imaging apparatus 101, the position measurement apparatus 102 that measures the positional information of the moving object 100 based on a moving image captured by the imaging apparatus 101, and the control apparatus 103 that controls the drive unit (e.g., the motor) of the moving object 100.

The imaging apparatus 101 captures the moving image of the ambient surrounding of the moving object 100. In the present modification, the imaging apparatus 101 is a stereo camera that is mounted on the moving object 100 and moves with the movement of the moving object 100. The imaging apparatus 101 may be configured to be fixed to a position and orientation where the position and orientation of the moving object 100 can be measured.

The position measurement apparatus 102 measures the self-position and orientation of the moving object 100 based on frame images (captured images) constituting the moving image captured by the imaging apparatus 101. Feature points extracted from the frame images are used to measure the self-position and orientation. In the present modification, the position measurement apparatus 102 extracts feature points from images captured by the stereo camera. Thus, it is possible to acquire the positional information of the extracted feature points in the three-dimensional coordinates with reference to the position of the stereo camera.

The control apparatus 103 controls not only the drive unit but also various apparatuses included in the moving object 100 based on the control information received from the information processing apparatus.

An example of a hardware configuration of the information processing apparatus according to the present modification is similar to that in the example in FIG. 2.

Figure 9:
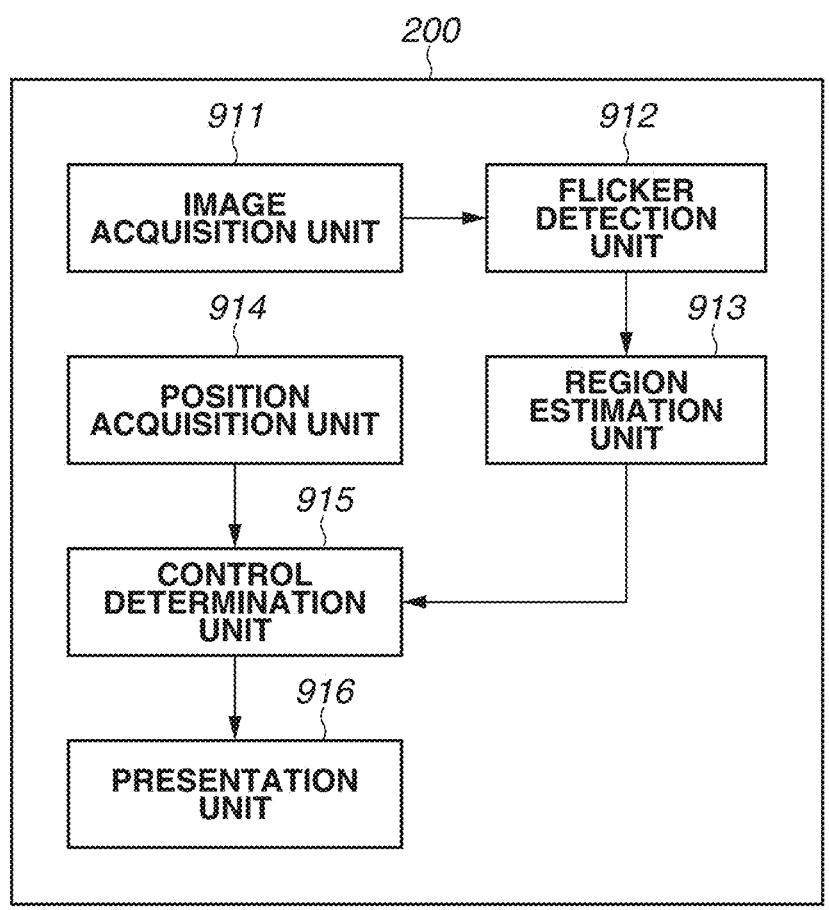
FIG. 9 illustrates an example of a functional configuration of the information processing apparatus.

FIG. 9 illustrates an example of a functional configuration of the information processing apparatus according to the present modification. The information processing apparatus functions as an image acquisition unit 911, a flicker detection unit 912, a region estimation unit 913, a position acquisition unit 914, a control determination unit 915, and a presentation unit 916 by the CPU 201 executing a program stored in the external memory 204.

The image acquisition unit 911 acquires the frame images constituting the moving image captured by the imaging apparatus 101. The image acquisition unit 911 sequentially provides the flicker detection unit 912 with the acquired frame images.

The flicker detection unit 912 detects an occurrence of a flicker origin luminance variation based on the frame images. In the present modification, the flicker detection unit 912 extracts feature points from the frame images provided by the image acquisition unit 911 and compares feature points between frame images captured at different times to detect a flickering feature point. The flicker detection unit 912 detects a position where the flicker origin luminance variation occurs based on the position coordinates of the flickering feature point. The flicker detection unit 912 performs matching between the frame images captured by the stereo camera as the imaging apparatus 101 to obtain the depth of the feature points, and converts the position coordinates of the feature points into the three-dimensional coordinates in the shipping storage where the moving object 100 moves. The three-dimensional coordinates are represented by the coordinate system representing the position in the shipping storage with the starting position of the moving object 100 set as the origin. The flicker detection unit 912 provides the region estimation unit 913 with a detection result.

The region estimation unit 913 estimates a region subjected to a change in position measurement accuracy due to the flicker origin luminance variation detected by the flicker detection unit 912. In the present modification, a coordinate space where the moving object 100 moves is divided into a plurality of regions. A point or region subjected to the position measurement accuracy degradation is estimated based on the number of flickering feature points included in each of the regions. The region estimation unit 913 provides the control determination unit 915 with the positional information of the estimated point and region. Based on the position coordinates of the flickering feature point, the region estimation 913 may recognize a certain range around the flickering feature point as a region affected by the flicker origin luminance variation, and estimate the region subjected to the position measurement accuracy degradation based on a logical sum of respective regions. When there is a plurality of points subjected to the degradation of the measurement accuracy of the position measurement apparatus 102, the region estimation unit 913 acquires a polygon that circumscribes the points and estimates an internal region of the polygon as a region subjected to the degradation of the measurement accuracy of the position measurement apparatus 102. The region estimation unit 913 may identify the point or region subjected to the degradation of the measurement accuracy of the position measurement apparatus 102 in a two- or three-dimensional space.

The position acquisition unit 914 acquires the positional information of the moving object 100 measured by the position measurement apparatus 102 from the moving object 100, and provides the control determination unit 915 with the positional information.

The control determination unit 915 determines the control information of the moving object 100 and peripheral apparatuses of the moving object 100 based on a positional relation between the positional information provided by the region estimation unit 913 and the positional information provided by the position acquisition unit 914. The control determination unit 915 determines the control information for stably moving (running) the moving object 100 even if the measurement accuracy of the position measurement apparatus 102 changes. The control determination unit 915 transmits the determined control information to the moving object 100 and the peripheral apparatuses of the moving object 100.

In the present modification, if the region estimated by the region estimation unit 913 lies in part of the path of the moving object 100, the control determination unit 915 determines to perform control to decelerate the moving object 100 with a predetermined deceleration. More specifically, the control determination unit 915 transmits the determined control information to the moving object 100 immediately before the moving object 100 enters the region estimated by the region estimation unit 913. When the moving object 100 receives the control information, the control apparatus 103 reduces the rotational speed of the motor to enable the moving object 100 to stably move (run) in a region subjected to the degradation of the measurement accuracy of the position measurement apparatus 102. When the moving object 100 is positioned in the region estimated by the region estimation unit 913, the control determination unit 915 may immediately transmit the determined control information to the moving object 100. Further, the control determination unit 915 may determine the positional information about the point on the path to switch to the deceleration control.

The presentation unit 916 displays the control information determined by the control determination unit 915 on the display unit 206.

Figure 10:
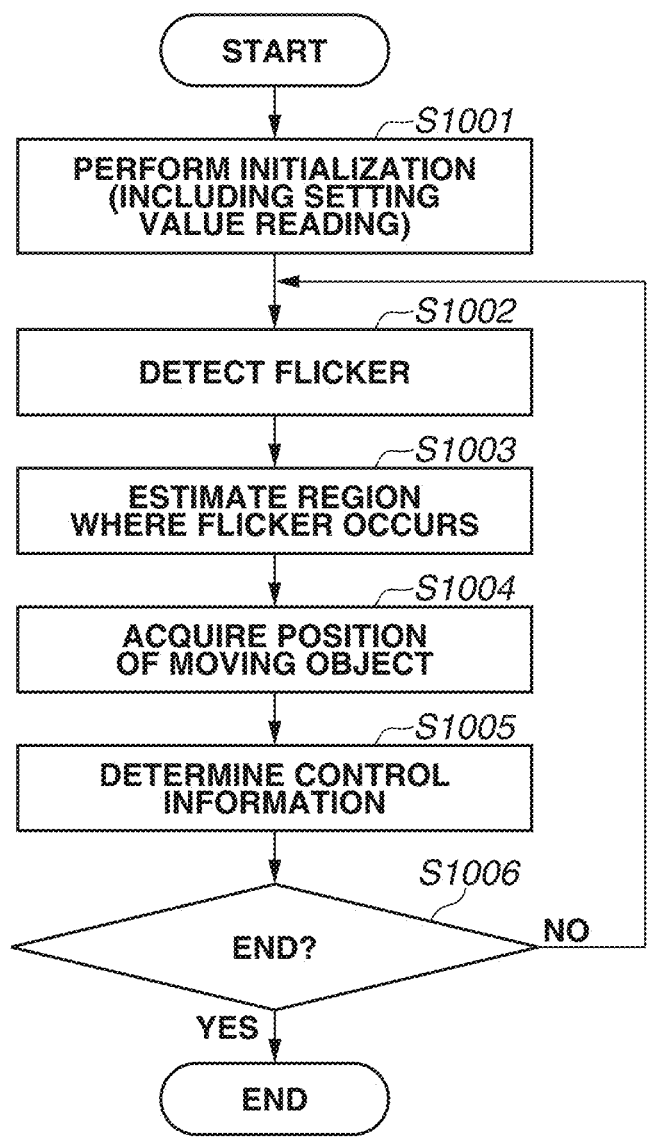
FIG. 10 is a flowchart illustrating the processing performed by the information processing apparatus.

Processing performed by the information processing apparatus according to the present modification will be described below. FIG. 10 is a flowchart illustrating the processing performed by the information processing apparatus according to the present modification. The flowchart in FIG. 10 is implemented by the CPU 201 loading a program stored in the external memory 204 into the RAM 203 and then executing the program. The flowchart in FIG. 10 is started when an information processing apparatus 200 is activated. The reference numeral of each step of the flowchart is supplied with a prefix S, which stands for step.

In step S1001 as an initialization step, the CPU 201 stores various setting values including the starting position and the operation speed of the moving object 100 in the ROM 202. The CPU 201 reads, from the external memory 204, the operation speed when the moving object 100 is decelerated, and predetermined parameters to be used to detect a change in position measurement accuracy from the flickering feature point in step S1003. The position measurement apparatus 102 acquires camera parameters necessary for the self-position measurement.

When the moving object 100 starts moving, the CPU 201 starts receiving a moving image currently being captured by the imaging apparatus 101 and a position and orientation currently being measured by the position measurement apparatus 102. The CPU 201 repetitively performs the processing in steps S1002 to S1005 at predetermined intervals. An interval may be a predetermined time interval or a predetermined distance interval on the path where the moving object 100 moves. The processing may be constantly and repetitively performed.

In step S1002, the CPU 201 detects a flicker in the moving environment of the moving object 100. In the present modification, first, the CPU 201 acquires frame images from data received from the moving object 100, and predicts a feature point in a frame image after a lapse of minute time based on a variation between the position and orientation at a certain time and the position and orientation after the lapse of minute time. Then, using actual frame images, the CPU 201 searches for an actual feature point existing around the predicted feature point. If no actual feature point exists, the CPU 201 sets the feature point as a flickering feature point. As described above, the CPU 201 extracts feature points from each of the frame images captured at different times, and selects a feature point extracted from one frame image but not extracted from another frame image as the flickering feature point.

A specific method for selecting the flickering feature point from among feature points in the frame images according to the present modification will be described below. In the following descriptions, it is assumed that a sufficient number of feature points for performing the position and orientation measurement in this step have been extracted although some feature points in the frame images cannot be extracted due to the flicker origin luminance variation. First, the CPU 201 determines the position and orientation of the imaging apparatus 101 measured from a feature point in a frame image, and position coordinates of the feature point in the frame image relative to the imaging apparatus 101 as initial values of the feature point. Since the position and orientation of the imaging apparatus 101 change with the movement of the moving object 100 after a lapse of minute time, the CPU 201 subsequently measures the position and orientation of the imaging apparatus 101 based on a frame image after the lapse of minute time and the above-described initial values. In this case, if some feature points in the frame image after the lapse of minute time cannot be extracted due to the flicker origin luminance variation, the number of feature points becomes smaller than the number of feature points predicted based on a change in the position and orientation. In the present modification, the CPU 201 observes a feature point that was predicted but not extracted, for a predetermined time period. If there is repetitively a difference between the predicted feature point and the extracted feature point, the CPU 201 selects the feature point as the flickering feature point. In the present modification, the CPU 201 searches for a feature point in a spherical region with a certain radius around a certain feature point in a certain frame image. If no feature point is included in the spherical region, the CPU 201 sets the certain feature point as the flickering feature point. The above-described observation time is read in step S1001. On the other hand, if the number of feature points in the frame image after the lapse of minute time is larger than the number of predicted feature points, the CPU 201 sets the larger number of feature points in the frame image as the initial value. In the present modification, when at least one flickering feature point is included in the frame image, the CPU 201 detects an occurrence of the flicker origin luminance variation. The CPU 201 stores the positional information of the flickering feature point detected in the frame image in the RAM 203.

In step S1003, the CPU 201 estimates a region subjected to the position measurement accuracy degradation due to a flicker based on the flickering feature points detected in step S1002. In the present modification, the CPU 201 divides the three-dimensional coordinates where the moving object 100 moves into sub regions, and acquires the number of feature points existing in each sub region based on the positional information of the flickering feature points detected in step S1002. Then, the CPU 201 estimates the region subjected to the position measurement accuracy degradation based on the number of flickering feature points existing in each sub region. More specifically, the CPU 201 sequentially subjects the sub regions to the estimation processing. When the number of flickering feature points existing in a target sub region is larger than or equal to a threshold value, the CPU 201 estimates the target sub region as the region subjected to the position measurement accuracy degradation. On the other hand, when the number of flickering feature points is less than the threshold value, the CPU 201 determines that the position measurement accuracy remains unchanged in the target sub region.

In step S1004, the CPU 201 acquires position coordinates of the moving object 100 in the space coordinate system where the moving object 100 moves from the data received from the moving object 100.

In step S1005, the CPU 201 calculates distances between respective regions estimated in step S1003 and the position of the moving object 100. When any of the distances is less than a predetermined threshold value, the CPU 201 determines that the moving object 100 is approaching a region subjected to the position measurement accuracy degradation and determines to perform the deceleration control on the moving object 100. On the other hand, when all of the distances are larger than or equal to the threshold value, the CPU 201 does not decelerate the moving object 100. The distance between each of the regions estimated in step S1003 and the position of the moving object 100 may be a distance on the path where the moving object 100 moves or a distance in the space coordinate system where the moving object 100 moves. The CPU 201 transmits the determined control information to the moving object 100 via the network I/F 207.

In step S1006, the CPU 201 repeats the processing in steps S1002 to S1005 until the CPU 201 determines that an end instruction is input from the input unit 205. When the CPU 201 determines that the end instruction is input (YES in step S1006), the processing exits the flowchart in FIG. 10.

Figure 11:
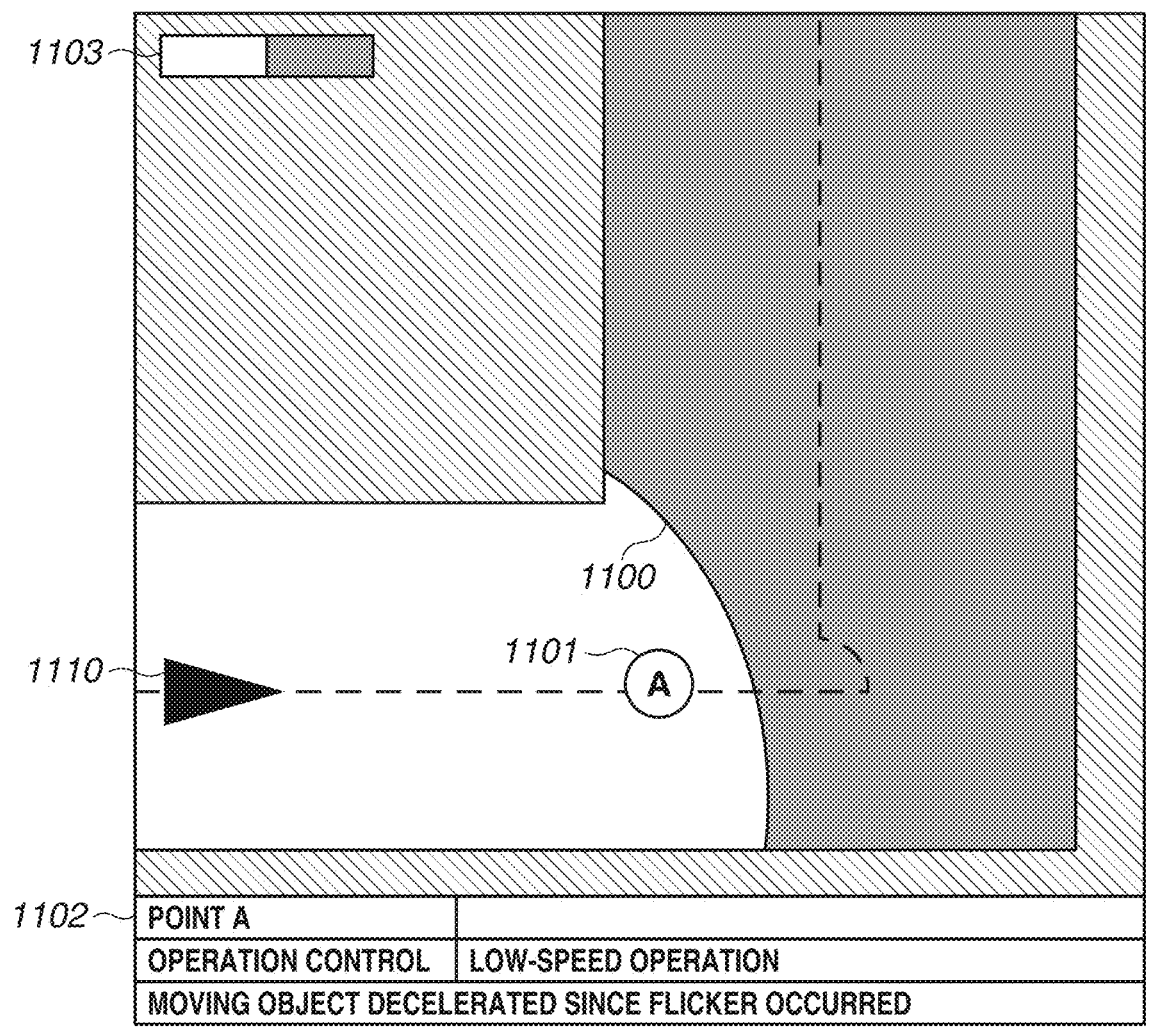
FIG. 11 illustrates an example of the GUI screen.

In the present modification, the CPU 201 displays a GUI screen that reflects the control information determined in step S1005 on the display unit 206. FIG. 11 illustrates an example of the GUI screen according to the present modification. The user confirms and edits the control information of the moving object 100 by using the GUI screen. As illustrated in FIG. 11, the GUI screen displays a level surface when space coordinates where the moving object 100 moves is viewed from above. An item 1110 indicates the position and orientation of the moving object 100 on the level surface. Shaded portions on the level surface indicate regions not permitted to be entered by the moving object 100, and the non-shaded portions thereon indicate regions permitted to be entered by the moving object 100. A broken line indicates the path of the moving object 100 planned by the user. The moving object 100 moves a certain distance in a straight line from the left edge of the level surface to the right, turns 90 degrees to the left, and then moves on a straight line.

A region 1100 is estimated to be subjected to the degradation of the measurement accuracy of the position measurement apparatus 102, and is displayed in gray on the map. In the present modification, the CPU 201 estimates the region subjected to the position measurement accuracy degradation based on the flickering feature point as described above. An icon 1101 indicates a point existing at a position out of and in the vicinity of the region 1100 on the path of the moving object 100. At the point, the control information are changed to the control information determined by the control determination unit 915 before the moving object 100 enters the region 1100. In the example illustrated in FIG. 11, the moving object 100 enters the region subjected to the position measurement accuracy degradation from a region not subjected to a change in position measurement accuracy due to a flicker. In the present modification, after passing the point indicated by the icon 1101, the moving object 100 moves (runs) at a speed lower than the normal moving speed.

The GUI screen includes a display box 1102 at the bottom, indicating the control information to be executed at the point of the icon 1101. The display box 1102 displays details of the control information determined in step S1005. More specifically, the display box 1102 displays a message notifying that the moving object 100 performs a low-speed operation from the point of the icon 1101 since a flicker occurred, and the operation speed. The GUI screen also includes a color bar 1103 at the upper left corner. The color bar 1103 represents the relation between the background color on the map and whether the position measurement accuracy is degraded. In the present modification, the CPU 201 displays the background color of a region subjected to the position measurement accuracy degradation in gray, thus distinguishing the region from a region where the position measurement accuracy remains unchanged. The above-described GUI screen enables the user to confirm a region where a flicker occurs and the control information of the moving object 100 that deal with the occurrence of a flicker.

The above-described first modification enables the moving object 100 having a self-position and orientation measurement function to stably move (run) while maintaining operation efficiency of the moving object 100 as far as possible even in an environment subjected to the position measurement accuracy degradation due to an occurrence of a flicker phenomenon.

As a first modification of the present modification, the method for detecting a flicker in step S1002 in FIG. 10 is not limited to the method for using feature points in a frame image. For example, the CPU 201 may detect a flicker based on a period of a luminance change in a frame image and a frame rate of a moving image captured by the imaging apparatus 101. The CPU 201 may also detect the occurrence of a flicker based on a change in the number of feature points between a plurality of frames. In this case, although the feature points are used, the position coordinates of the feature points are not used. For example, the CPU 201 may detect the occurrence of a flicker based on a decrease in the number of feature points in a frame image after a lapse of minute time. Alternatively, illumination information about the light source 710 (e.g., whether the flicker phenomenon occurs, the flicker frequency, and the irradiation range in the space coordinates where the moving object 100 moves) is prestored in the ROM 202, and the CPU 201 may detect a change of the illumination information based on information acquired from another system. The CPU 201 may also detect the occurrence of a flicker and estimate a region where the flicker occurs based on a plurality of illuminometers installed near the path of the moving object 100, a measurement result by a flicker measurement apparatus including an oscilloscope, and information about measuring ranges of the illuminometers. In detecting the occurrence of a flicker, the CPU 201 uses a period of measured illuminance changes and the frame rate of a moving image captured by the imaging apparatus 101. Another method uses a camera (hereinafter referred to as a fixed camera) installed at a position and orientation where the periphery and the moving environment of the moving object 100 can be captured, with the same frame rate setting as the imaging apparatus 101. In this case, the CPU 201 may perform threshold value processing for a luminance change for each pixel of a frame image of a moving image captured by the fixed camera to detect a flicker and the irradiation range of the light source 710 where the flicker occurs. A conversion matrix for converting the image coordinates of the fixed camera into the space coordinates where the moving object 100 moves is prestored in the ROM 202. The CPU 201 converts the position coordinates of the irradiation range by using the conversion matrix and estimates a region where the flicker occurs.

As a second modification of the present modification, the method for obtaining the positional information of the flickering feature point in step S1002 in FIG. 10 is not limited to the method for using a stereo camera. The imaging apparatus 101 does not need to be a stereo camera. In this case, the CPU 201 may obtain the three-dimensional coordinates of the flickering feature point based on a frame image of the imaging apparatus 101 as a single-lens camera and a moving amount of the moving object 100. The CPU 201 may read a three-dimensional map of the environment where the moving object 100 moves, and obtain the three-dimensional coordinates of the feature point on the frame image by using the three-dimensional map.

As a third modification of the present modification, the method for measuring the self-position and orientation is not limited to the method for using a captured image of the imaging apparatus 101 as long as the method is capable of measuring the positional information of the moving object 100 in the world coordinate system in the operating environment of the moving object 100. Examples of the method include a method for measuring the positional information of the moving object 100 through image measurement or image recognition based on a captured image of a camera not mounted on the moving object 100. Alternatively, the method may be a method for using the edge arrangement and distance information obtained from a depth image as indexes of position measurement.

As a fourth modification of the present modification, the control information determined in step S1005 in FIG. 10 are not limited to the deceleration control on the moving object 100. For example, the CPU 201 may control a sound output apparatus (not illustrated) mounted on the moving object 100 to output a warning sound. In this case, the CPU 201 may control the sound output apparatus to change the output warning sound depending on the distance to a region where a flicker occurs and the degree of the position measurement accuracy degradation in the region where the flicker occurs. To make it easier to extract feature points from an image captured by the imaging apparatus 101, the CPU 201 may perform control to change the image processing parameters used by the position measurement apparatus 102 to extract feature points. The CPU 201 may also perform control to change feature points on the map information and change the map information when the position measurement apparatus 102 performs the position and orientation measurement. The CPU 201 may also perform control to change the frame rate setting of the imaging apparatus 101 to enable synchronization with the flicker frequency. The CPU 201 may also perform control to change the path so that the moving object 100 detours the point or region estimated in step S1004 in FIG. 10. The CPU 201 may also perform control to accelerate the moving object 100 when the distance between each point estimated in step S1004 and the position of the moving object 100 becomes larger than or equal to a threshold value.

<Second Modification>

The first modification has been described above centering on the method for detecting a change in the measurement accuracy of the position measurement apparatus 102 based on the flickering feature point included in the frame image of the imaging apparatus 101 mounted on the moving object 100. A second modification will be described below centering on a method for dynamically changing the control information based on the degree of the measurement accuracy variation in a point or region subjected to a change in the measurement accuracy. The second modification will be described below centering on a difference from the first modification. Descriptions of portions similar to those in the first modification will be omitted.

Figure 12:
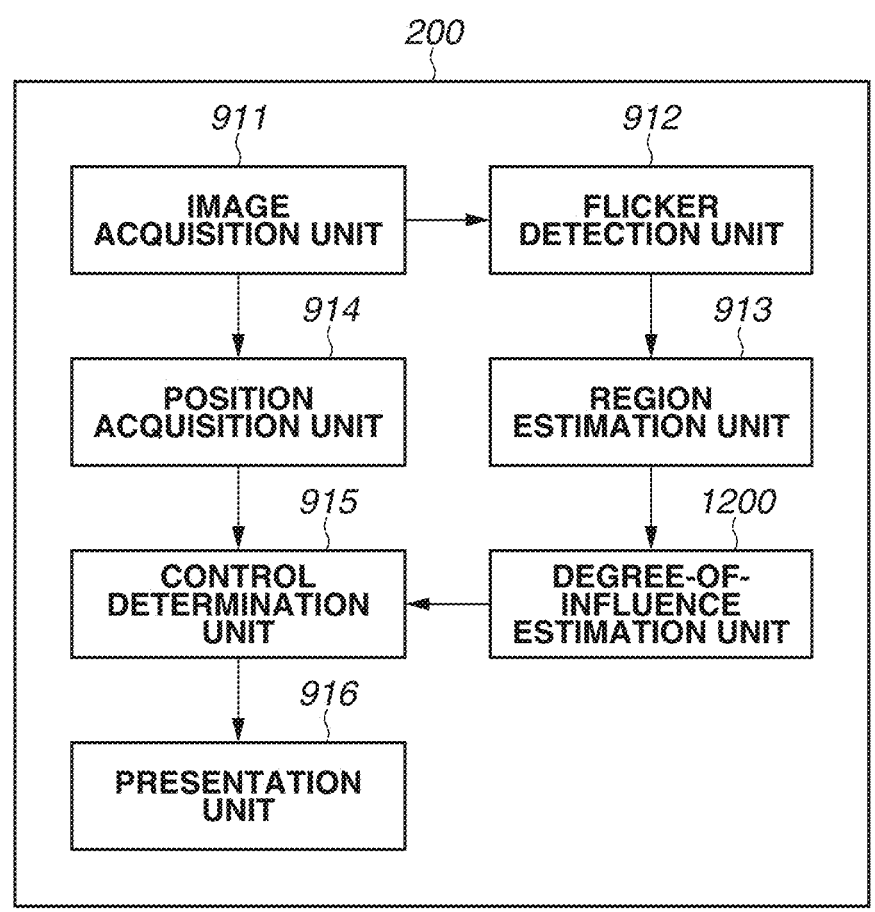
FIG. 12 illustrates an example of the functional configuration of the information processing apparatus.

FIG. 12 illustrates an example of a functional configuration of the information processing apparatus according to the present modification. In the first modification, the region estimation unit 913 divides the coordinate space where the moving object 100 moves, and determines whether the number of flickering feature points included in each divided region is larger than or equal to a threshold value to estimate a region subjected to the measurement accuracy degradation. The configuration in FIG. 12 differs from that in FIG. 9 in that a function of a degree-of-influence estimation unit 1200 is added between the region estimation unit 913 and the control determination unit 915. In the present modification, the degree-of-influence estimation unit 1200 estimates the degree of the influence on the position measurement accuracy based on the number of flickering feature points in the region estimated by the region estimation unit 913. In the present modification, the control determination unit 915 differentiates the control information depending on the estimation result by the degree-of-influence estimation unit 1200. For example, the control determination unit 915 performs control to reduce the moving speed of the moving object 100 in a stepwise manner depending on the degree of the position measurement accuracy degradation.

Figure 13:
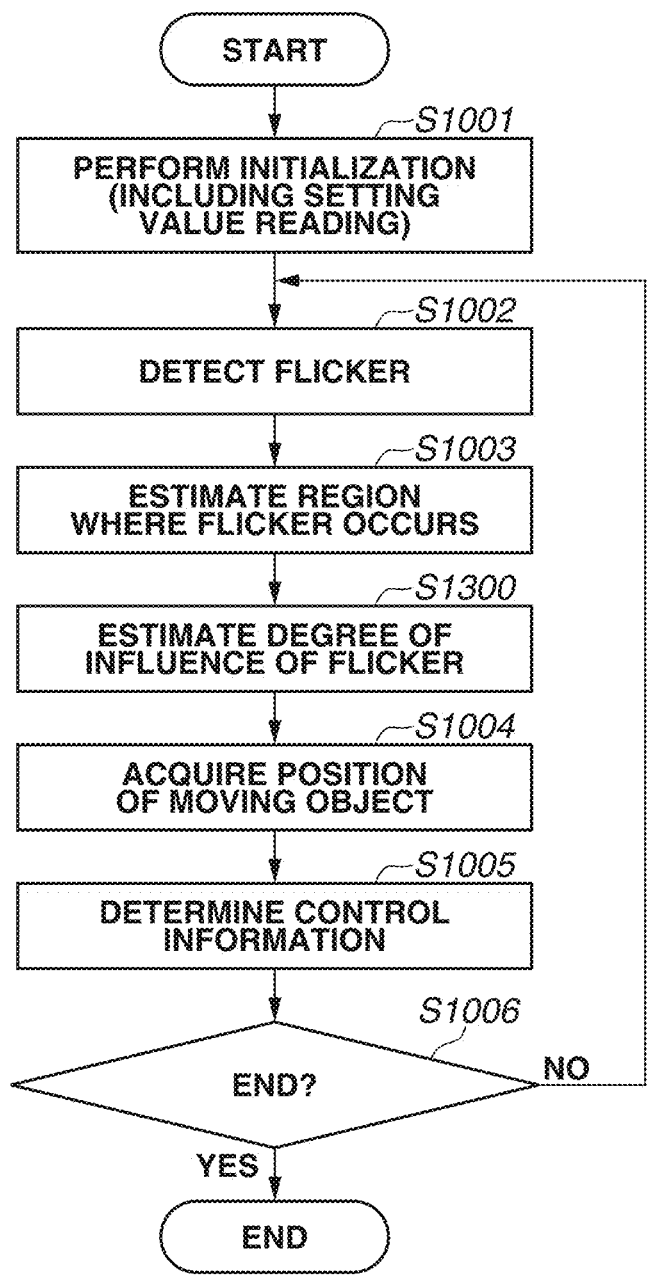
FIG. 13 is a flowchart illustrating the processing performed by the information processing apparatus.

Processing performed by the information processing apparatus according to the present modification will be described below. FIG. 13 is a flowchart illustrating the processing performed by the information processing apparatus according to the present modification. The flowchart in FIG. 13 differs from that in FIG. 10 in that step S1300 is added after step S1003.

In step S1300, the CPU 201 estimates the degree of the influence on the position measurement accuracy for the region estimated in step S1003. More specifically, the CPU 201 estimates the degree of the position measurement accuracy degradation based on the number of flickering feature points included in the region estimated in step S1003. In the present modification, in step S1001, the CPU 201 reads a data table that converts such that the degree of the position measurement accuracy degradation increases with the increasing number of flickering feature points. In his step, the CPU 201 acquires the number of flickering feature points for each of the sub regions made in the division processing in step S1003, and estimates the degree of the position measurement accuracy degradation in the target sub region by referencing the data table that enables the degree of the position measurement accuracy degradation to be acquired uniquely based on the number of flickering feature points.

In step S1005, the CPU 201 calculates the control parameters corresponding to the degree of the accuracy degradation estimated in step S1300. In the present modification, the CPU 201 controls the speed of the moving object 100 by using a control parameter table read in step S1001. More specifically, when the moving object 100 moving in a region subjected to the position measurement accuracy degradation enters a region subjected to a larger degree of the position measurement accuracy degradation, the CPU 201 performs the deceleration control on the moving object 100 by referencing the control parameter table. On the other hand, when the moving object 100 enters a region subjected to a smaller degree of the position measurement accuracy degradation, the CPU 201 performs an acceleration control on the moving object 100 by referencing the control parameter table.

Figure 14:
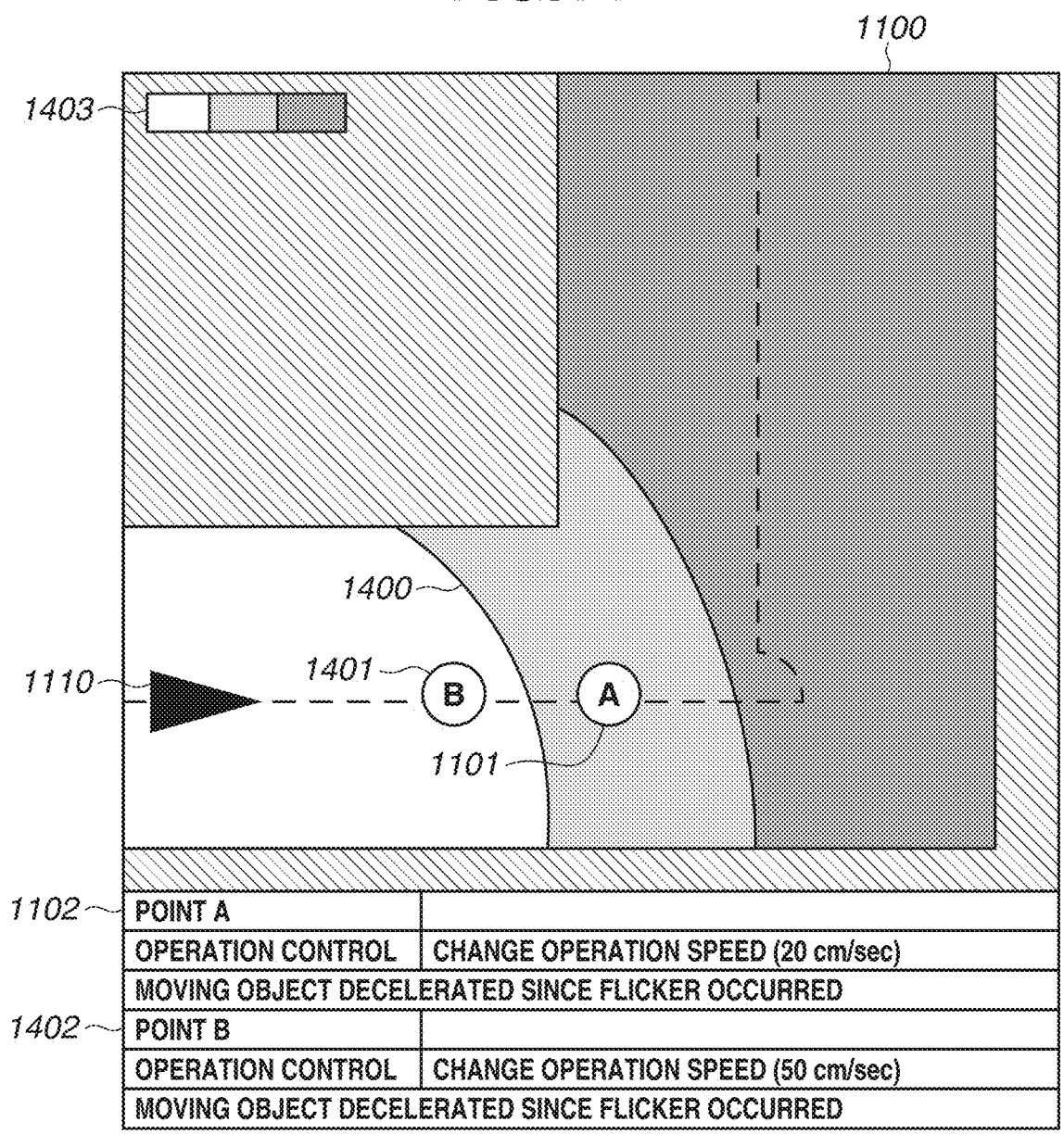
FIG. 14 illustrates an example of the GUI screen.

FIG. 14 illustrates an example of the GUI screen according to the present modification. Descriptions will be made centering on a difference from the GUI screen in FIG. 11. A region 1400 is estimated to be subjected to the degradation of the measurement accuracy of the position measurement apparatus 102, and is displayed in gray on the map. The region 1400 is displayed in lighter gray than the region 1100 to be differentiated in display pattern from the region 1100. This indicates that the region 1400 has different control information from that of the region 1100. The region 1400 is subjected to a smaller degree of the position measurement accuracy degradation than the region 1100.

An icon 1401 indicates a point existing at a position out of and in the vicinity of the region 1400 on the path of the moving object 100. At the point, the control information are changed to the control information determined by the control determination unit 915 before the moving object 100 enters the region 1400. Since the region 1400 is different from the region 1100 in the degree of the position measurement accuracy degradation, the CPU 201 performs control on the icon 1401 in a different way from the control on the icon 1101.

A display box 1402 indicating the control information to be performed at the point of the icon 1401 is provided below the display box 1102 indicating the control information to be performed at the point of the icon 1101. The display box 1402 displays a message notifying that the moving object 100 performs a low-speed operation from the point of the icon 1401 since a flicker occurred, and the operation speed. The control information are changed between the regions 1100 and 1400 depending on the degree of the position measurement accuracy degradation and the control parameter table read in step S1001. In the present modification, since the degree of the position measurement accuracy degradation in the region 1400 is smaller than that in the region 1100, the operation speed in the region 1400 is higher than that in the region 1100 and lower than the normal operation speed.

A color bar 1403 represents the relation between the background color on the map and the degree of the position measurement accuracy degradation of the position measurement apparatus 102. In the present modification, the degree of the position measurement accuracy degradation in the environment where the moving object 100 moves is represented by the density of the background color. In the present modification, the color bar 1403 indicates that a region with a darker color is subjected to a larger degree of the position measurement accuracy degradation.

The above-described second modification enables the moving object 100 having a self-position and orientation measurement function to stably move (run) while maintaining the operation efficiency of the moving object 100 as far as possible even in an environment subjected to the position measurement accuracy degradation due to an occurrence of a flicker phenomenon.

As a modification of the present modification, the method for estimating the degree of the position measurement accuracy variation is not limited to the method for using the number of flickering feature points in each of the sub regions acquired in the division processing in step S1003. For example, the CPU 201 may detect a flicker phenomenon of the light source 710 based on the output value of an illuminance sensor, and estimate the degree of the position measurement accuracy degradation based on the flicker frequency of the light source 710 and the frame rate of a moving image captured by the imaging apparatus 101. The CPU 201 may acquire the degree of the position measurement accuracy degradation so that the degradation degree increases with increasing size of a range where a flicker origin luminance variation occurs. The CPU 201 may also acquire the degree of the position measurement accuracy degradation so that the degradation degree increases with increasing variation of the pixel luminance value on frame images of the imaging apparatus 101. When acquiring the degree of the position measurement accuracy degradation based on image information, the CPU 201 may use an image captured by a fixed camera installed at a position and orientation where the periphery and moving environment of the moving object 100 can be captured, without using the image captured by the imaging apparatus 101.

<Third Modification>

The first modification has been described above centering on the method for estimating the region subjected to the position measurement accuracy degradation based on the flickering feature points included in the frame image of the imaging apparatus 101 mounted on the moving object 100. A third modification will be described below centering on a method for sharing a region subjected to the position measurement accuracy degradation among a plurality of moving objects 100 operating in the shipping storage. The third modification will be described below centering on a difference from the first modification. Descriptions of portions similar to those in the first modification will be omitted.

Figure 15:
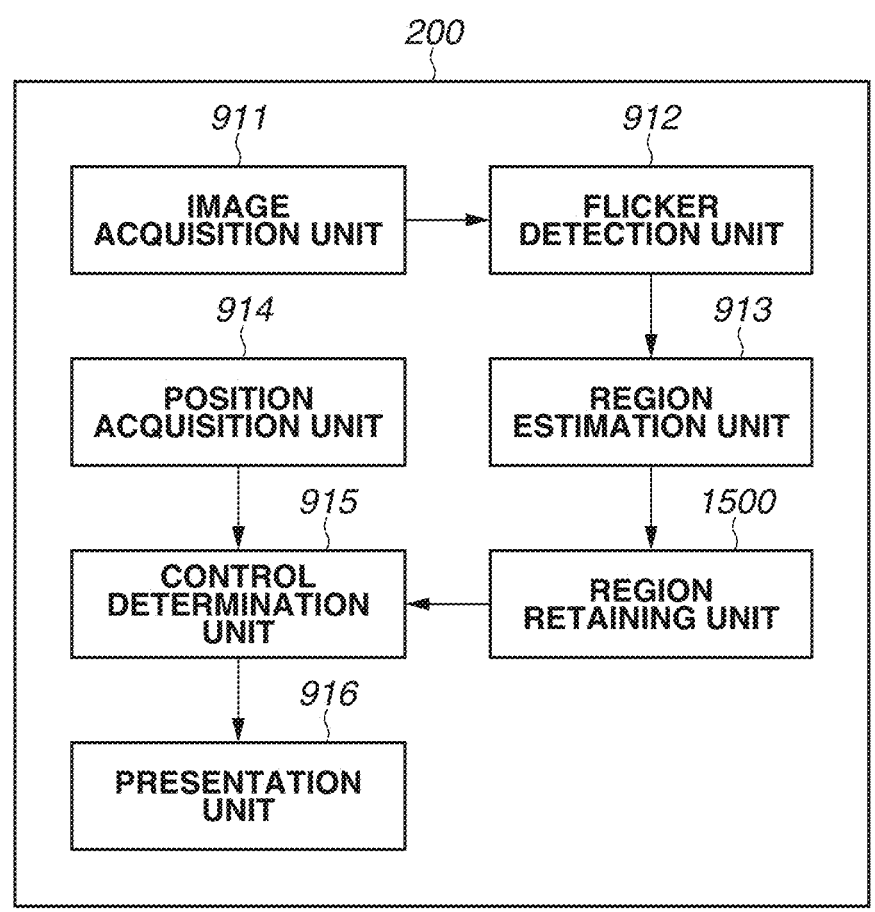
FIG. 15 illustrates an example of the functional configuration of the information processing apparatus.

FIG. 15 illustrates an example of a functional configuration of the information processing apparatus 200 according to the present modification. The configuration in FIG. 15 differs from that in FIG. 9 in that a function of a region retaining unit 1500 is added between the region estimation unit 913 and the control determination unit 915. The region retaining unit 1500 stores an estimation result by the region estimation unit 913 in the RAM 203. Since the present modification is based on the environment of the shipping storage where the plurality of moving objects 100 is operating, regions subjected to the position measurement accuracy degradation estimated by imaging apparatuses 101 mounted on the respective moving objects 100 are integrated. In this case, the information processing apparatus integrates the regions subjected to the position measurement accuracy degradation using a logical sum. In the present modification, a flicker origin luminance variation is detected from a captured image of the imaging apparatus 101 of each of the plurality of moving objects 100. Thus, a flicker origin luminance variation can be detected for a wider range in the moving environment of the moving objects 100 than in the case where a single moving object 100 is used. In a region out of an image capturable range of the imaging apparatus 101 of a certain moving object 100, a flicker origin luminance variation may be detected in a captured image of the imaging apparatus 101 of another moving object 100. Thus, in the case where captured images of the plurality of moving objects 100 are integrally used, a flicker origin luminance variation can be detected at an earlier timing than in the case where a captured image of a single moving object 100 is used. The control determination unit 915 determines the control information for each of the moving objects 100 based on a result of integrating regions subjected to the position measurement accuracy degradation acquired from the plurality of moving objects 100 and the positional information of each of the moving objects 100.

The above-described third modification enables the moving objects 100 each having a self-position and orientation measurement function to stably move (run) while maintaining the operation efficiency of the moving objects 100 as far as possible even in an environment subjected to the position measurement accuracy degradation due to an occurrence of a flicker phenomenon.

As a modification of the present modification, data shared among the plurality of moving objects 100 is not limited to the estimation result by the region estimation unit 913. For example, the CPU 201 may retain the position coordinates of the flickering feature points and the control information. The CPU 201 may store and update region information as the estimation result by the region estimation unit 913 during movement of the moving object 100. In step S1003, the CPU 201 may read the region information of other moving objects 100 stored in the ROM 202.

The present disclosure has been described above together with exemplary embodiments. However, the above-described exemplary embodiments are to be merely considered as examples in embodying the present disclosure, and are not to be interpreted as restrictive on the technical scope of the present disclosure. The present invention may be embodied in diverse forms without departing from the technical concepts or essential characteristics thereof.

The present disclosure can also be achieved when a program for implementing at least one of the functions according to the above-described exemplary embodiments is supplied to a system or an apparatus via a network or a storage medium, and at least one processor in a computer of the system or the apparatus reads and executes the program. Further, the present disclosure can also be achieved by a circuit (for example, an application specific integrated circuit (ASIC)) for implementing at least one function.

The present disclosure makes it possible to stably move a moving object.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2021-125243, filed Jul. 30, 2021, and No. 2021-125231, filed Jul. 30, 2021, which are hereby incorporated by reference herein in their entirety.

What is claimed is:

1. An information processing apparatus for controlling a moving device that includes measuring unit for measuring a position of the moving device from frame images of a moving picture capturing surroundings of the moving device, the information processing apparatus comprising:
a memory storing instructions; and
at least one processor that, upon execution of the instructions, is configured to operate as:
detection unit configured to detect, as blinking feature points, feature points that are extracted from one frame image captured at one time but not extracted from another frame image captured at a different time, and to detect, based on the blinking feature points, the occurrence of brightness fluctuations caused by flicker in an environment in which the moving device moves;
an estimation unit configured to divide a space in which the moving device moves into a plurality of regions, and to estimate, as a region in which measurement accuracy of the measuring unit changes due to brightness fluctuations caused by flicker, a region in which the number of the blinking feature points detected by the detection means is greater than or equal to a threshold; and
a determination unit configured to determine, based on the region in which the measurement accuracy changes, a speed of the moving device or a moving route of the moving device.

2. The information processing apparatus according to claim 1,
wherein execution of the stored instructions further configures the at least one processor to operate as:
a position acquisition unit configured to acquire positional information indicating a position of the moving device measured by a measurement unit, based on feature points extracted from captured images of surroundings of the moving device, and
wherein the determination unit determines a speed of the moving device or a moving route of the moving device based on a positional relationship between the region in which the estimation unit has estimated that the measurement accuracy changes and the position information acquired by the position acquisition unit.

3. The information processing apparatus according to claim 1,
wherein the estimation unit further estimates the degree of change in measurement accuracy based on the number of the blinking feature points detected by the detection unit, and
wherein the determination unit determines a speed of the moving device or a moving route of the moving device based on said degree of change.

4. The information processing apparatus according to claim 1, wherein the environmental information indicates a light condition from a light source in a path where the moving object moves.

5. The information processing apparatus according to claim 1, wherein execution of the stored instructions further configures the at least one processor to operate as:
a presentation unit configured to present the content of the control information determined by the determination unit.

6. An information processing method, executed by one or more processors, for controlling a moving device that measures a position of the moving device from frame images of a moving picture capturing surroundings of the moving device, the method comprising:
detecting, as blinking feature points, feature points that are extracted from one frame image captured at one time but not extracted from another frame image captured at a different time, and detecting, based on the blinking feature points, the occurrence of brightness fluctuations caused by flicker in an environment in which where the moving device moves;
divide a space in which the moving device moves into a plurality of regions, and estimating, as a region in which measurement accuracy of the measuring changes due to brightness fluctuations caused by flicker, a region in which the number of the blinking feature points detected by the detection means is greater than or equal to a threshold; and determining, based on the region in which the measurement accuracy changes, a speed of the moving device or a moving route of the moving device.

7. A non-transitory computer-readable storage medium storing instructions that, when executed by one or more processors, configure an information processing apparatus to execute a control method for controlling a moving device that measures a position of the moving device from frame images of a moving picture capturing surroundings of the moving device, the control method comprising:

detecting, as blinking feature points, feature points that are extracted from one frame image captured at one time but not extracted from another frame image captured at a different time, and detecting, based on the blinking feature points, the occurrence of brightness fluctuations caused by flicker in an environment in which where the moving device moves;

dividing a space in which the moving device moves into a plurality of regions, and estimating, as a region in which measurement accuracy of the measuring changes due to brightness fluctuations caused by flicker, a region in which the number of the blinking feature points detected by the detection means is greater than or equal to a threshold; and determining, based on the region in which the measurement accuracy changes, a speed of the moving device or a moving route of the moving device.

8. The information processing apparatus according to claim 1, wherein, when multiple regions in which the measurement accuracy changes exist in the space in which the moving device moves, the estimation unit estimates, as the region in which the measurement accuracy changes, an internal region of a polygon formed based on said multiple regions in which the measurement accuracy changes.

* * * * *